United States Patent [19]
Dyben et al.

[11] Patent Number: 4,756,076
[45] Date of Patent: Jul. 12, 1988

[54] METHOD FOR MAKING A RESISTIVE LEVEL SENSOR

[75] Inventors: Jerry F. Dyben, Fort Wayne, Ind.; Stanley S. Wulc, Rydal, Pa.

[73] Assignee: Tokheim Comporation, Fort Wayne, Ind.

[21] Appl. No.: 904,335

[22] Filed: Oct. 22, 1986

Related U.S. Application Data

[62] Division of Ser. No. 659,326, Oct. 10, 1984, Pat. No. 4,637,254.

[51] Int. Cl.⁴ .......................................... H01C 17/02
[52] U.S. Cl. .................................. 29/621.1; 29/613; 338/99; 338/114; 156/201; 156/272.2; 156/292; 156/299; 156/324; 156/308.2
[58] Field of Search .............. 29/610 R, 613; 338/99, 338/114; 156/201, 272.2, 292, 299, 308.2, 324; 73/304 R, 308, 301, 314

[56] References Cited

U.S. PATENT DOCUMENTS

| | | | |
|---|---|---|---|
| 2,713,793 | 5/1952 | Andersen | 73/301 |
| 3,106,693 | 10/1963 | De Giers | 338/33 |
| 3,153,342 | 10/1964 | Pierce et al. | 73/301 |
| 3,350,940 | 11/1967 | Stone | 73/301 |
| 3,495,457 | 2/1970 | Hage et al. | 73/301 |
| 3,513,701 | 6/1970 | Soltanoff | 73/301 |
| 3,753,200 | 8/1973 | Niejadlik | 338/42 |
| 3,755,804 | 8/1973 | Johnson | 340/244 |
| 3,783,689 | 1/1974 | Ehrenfried et al. | 73/301 |
| 3,982,219 | 9/1976 | Rehak | 338/114 |
| 4,142,079 | 2/1979 | Bachman | 200/84 |

FOREIGN PATENT DOCUMENTS

| | | | |
|---|---|---|---|
| 2503861 | 10/1982 | France | 73/305 |
| 56-14119 | 2/1981 | Japan | 73/305 |
| 716958 | 3/1951 | United Kingdom | 73/301 |
| 970119A | 10/1982 | U.S.S.R. | 73/313 |

*Primary Examiner*—P. W. Echols
*Attorney, Agent, or Firm*—Jeffers, Hoffman & Niewyk

[57] ABSTRACT

This invention pertains to gauge apparatus for measuring liquid levels comprising an elongated electrical sensor adapted to be arranged in upright position while immersed so constructed as to have an electrical resistance which may be varied. The sensor is fabricated by providing a rigid elongated support and securing an elongated array of resistors thereto. A flexible layer of conductive material is then applied to the surface of a sheet of flexible insulated material after which the sheet is secured to the support with the conductive material facing the resistors. After the sheet is secured to the support, it is heated, whereby the sheet will return to a position in spaced relation from the resistors. Further, an elongated planar magnet is secured to the rigid support on the side facing the sheet. The magnet is polarized such that the surface facing the sheet has elongated contiguous opposite poles joined along a straight line. The array of resistors is mounted on the magnet surface.

4 Claims, 14 Drawing Sheets

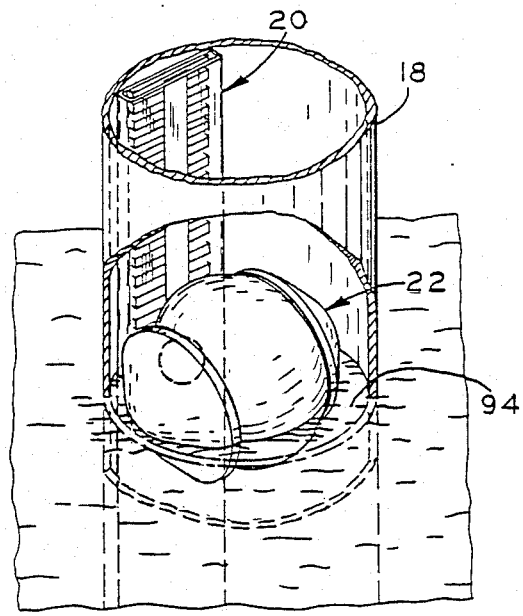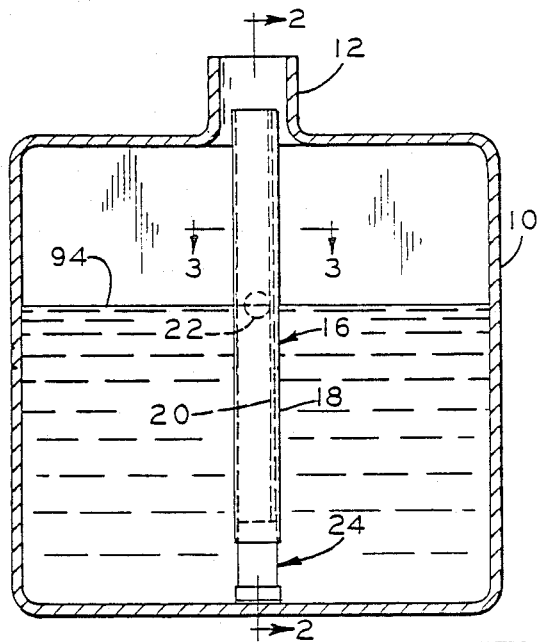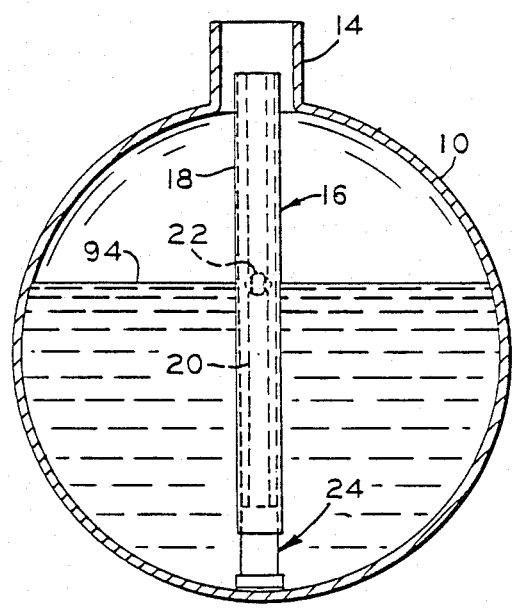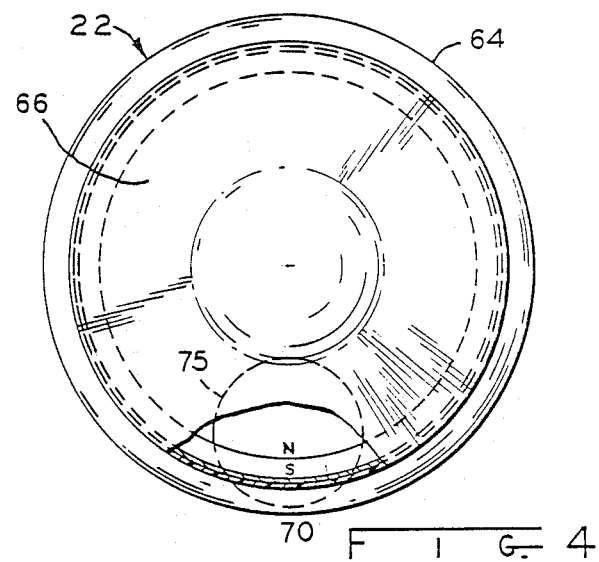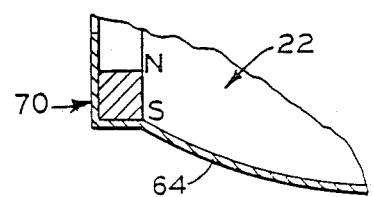

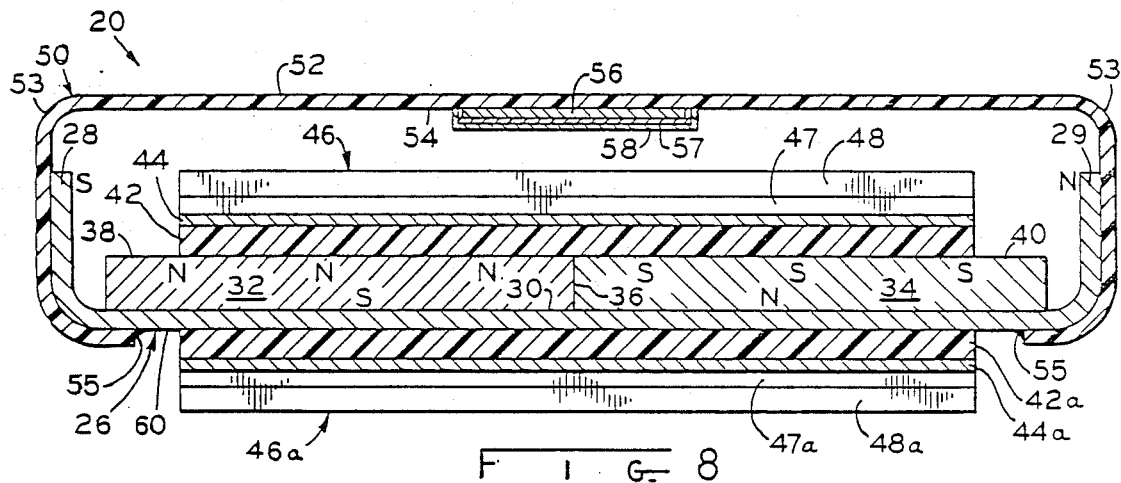
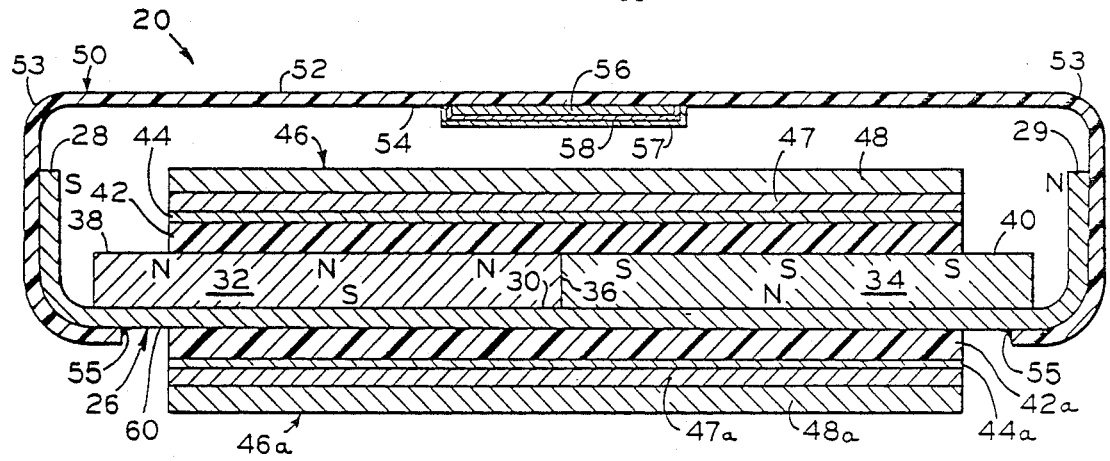
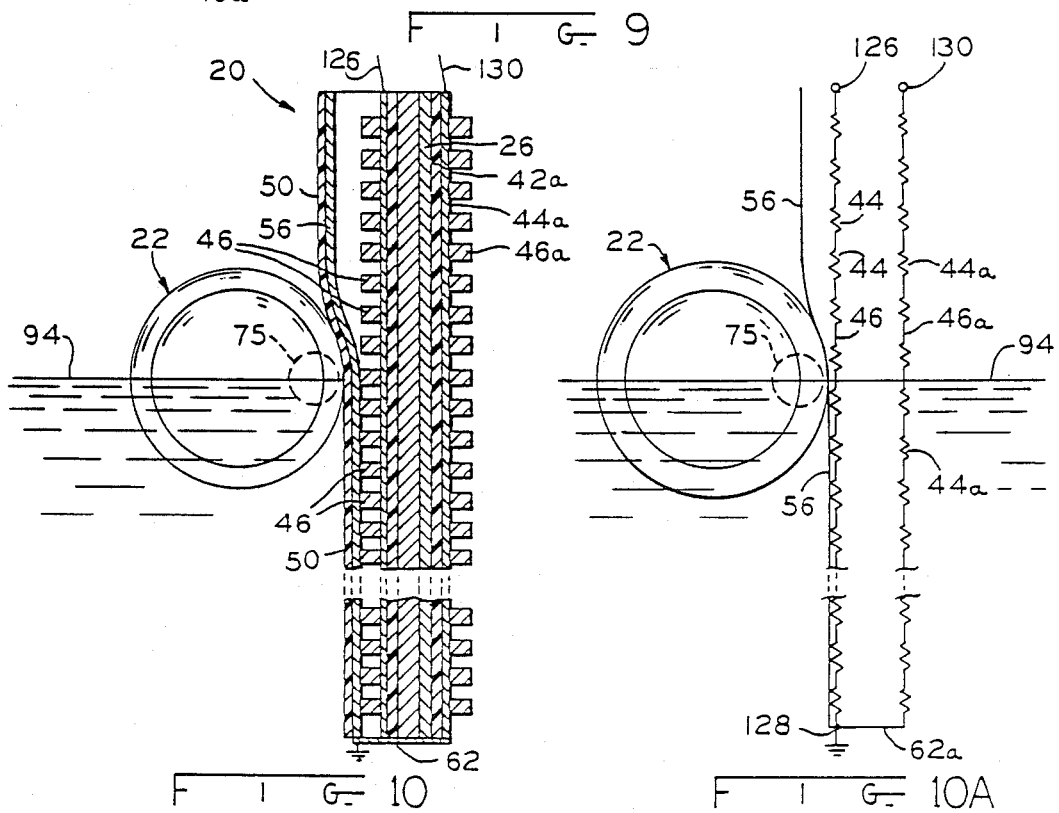

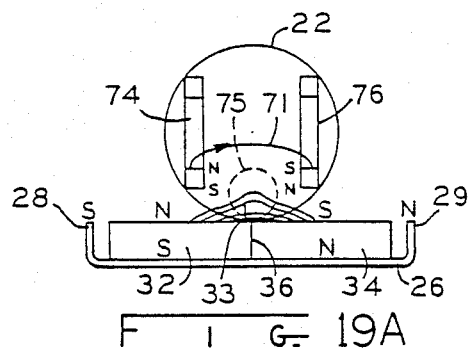
FIG. 19A
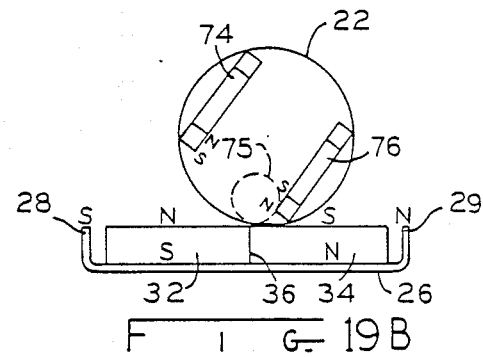
FIG. 19B
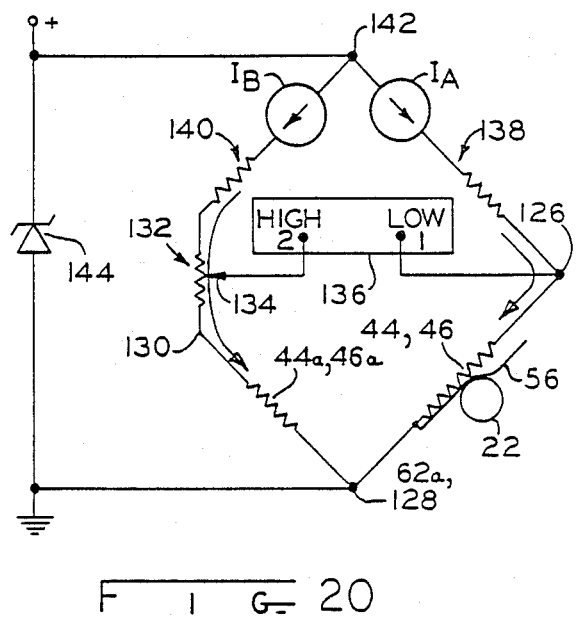
FIG. 20
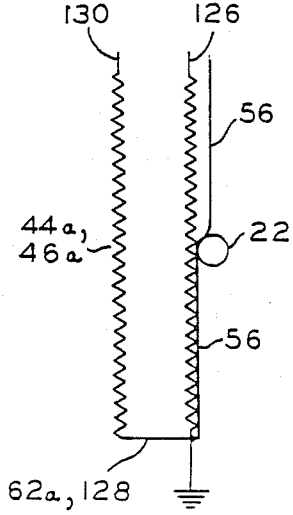
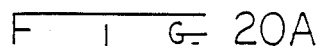
FIG. 20A
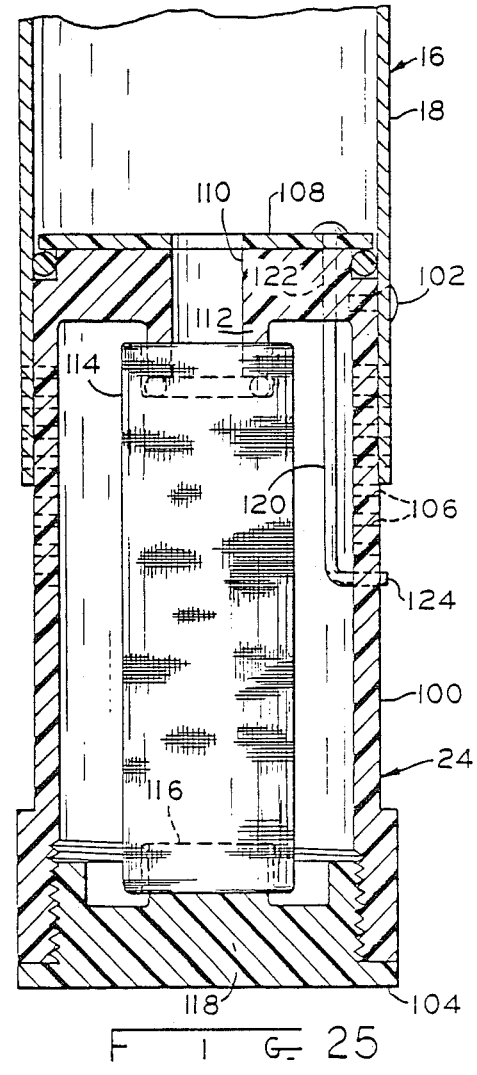
FIG. 25

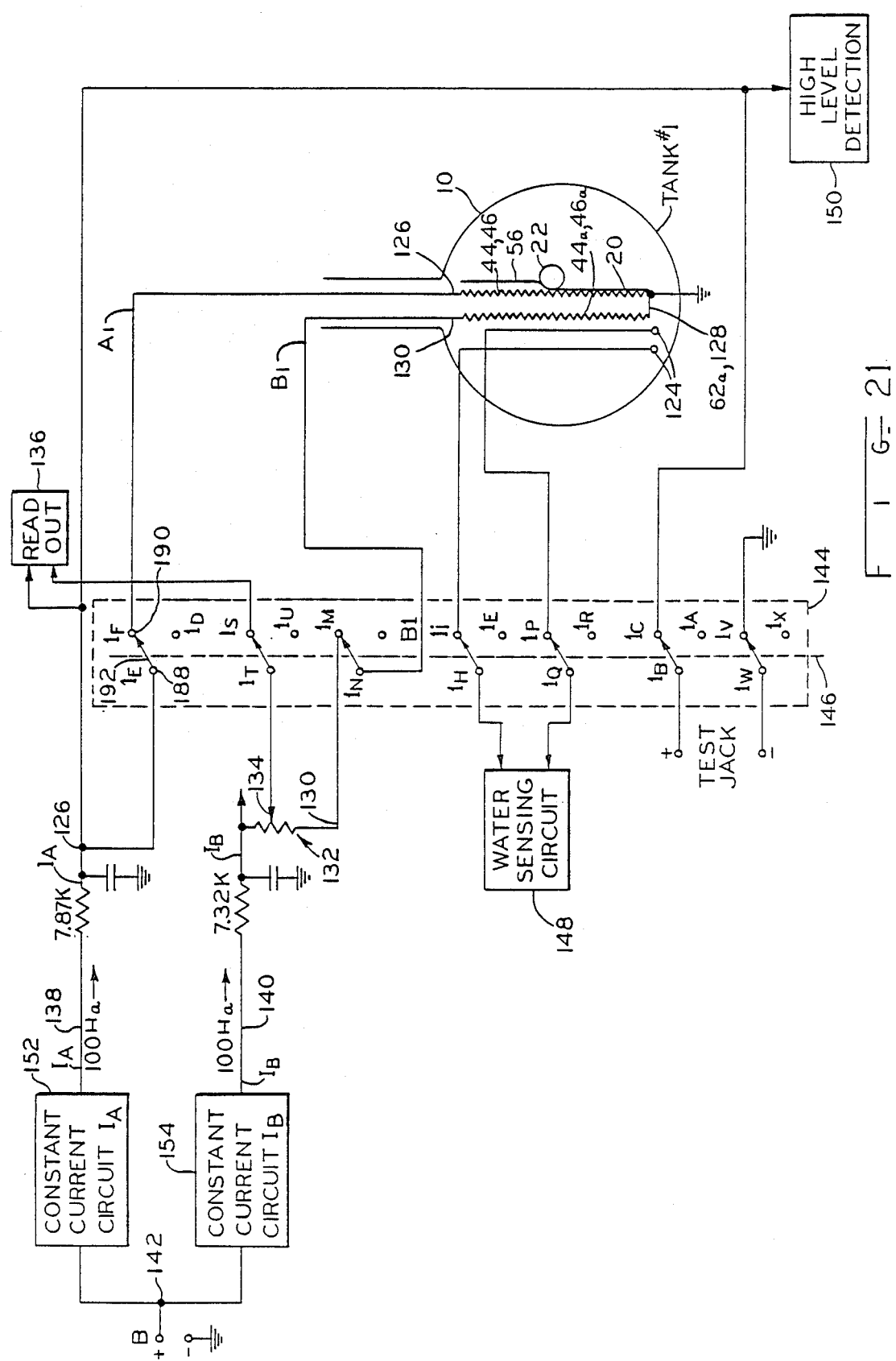

METHOD FOR MAKING A RESISTIVE LEVEL SENSOR

This is a division of application Ser. No. 659,326, filed Oct. 10, 1984 now U.S. Pat. No. 4,637,254.

FIELD OF THE INVENTION

The present invention relates generally to fluid level gauges, and more particularly to gauges for providing an indication of the level of liquid in a storage vessel, such as gasoline in a storage tank. In general, it is common to fill periodically storage tanks with liquid, such as gasoline, from which measured quantities are dispensed until the contents of the tank are substantially depleted at which time the tank is filled again. It is necessary to determine the volume of the contents dispensed in any given instance and also to provide an indication of the quantity of liquid in the tank.

Conventionally and somewhat crudely, a simple measuring stick is immersed into the tank to provide an indication of the quantity of liquid therein as well as a measure of liquid dispensed. Floats of prior art gauges generally speaking have been prone to malfunction and to be the cause of inaccurate readings. Such floats have usually required mechanical means to guide them, with sliding friction which is non-uniform at best being ever present. Sticking floats have been the cause of inoperability.

the present invention utilizes a totally different approach to solve these problems. No mechanical guides are employed, instead magnetic fields provide the guiding influence while the shape of the float and its support render float movement almost frictionless. The float per se in one embodiment has an annular section which is spherically shaped to roll on an elongated, flat support having a surface of plastic material, the support normally being immersed in the liquid being measured. The rolling engagement in the first instance provides for minimum friction and the wetted plastic surface reduces friction even further.

Other, more sophisticated mechanical and electrical devices have been provided for performing essentially the same function, for example, the sensor known in the trade as the METRITAPE as manufactured by Metritape, Inc., 33 Bradford Street, Concord, Mass., U.S.A. This in general is an elongated resistive element suspended from top to bottom of the tank to measure liquid level. A length of resistance helix is enclosed within a flexible sheath which is collapsed onto that portion of the helix below the surface of the liquid by reason of the pressure head thereby shorting it out. The length portion above the surface is unshorted and continuously represents, in ohms, the distance from the top of the sensor down to the liquid surface. The wound resistance helix is supported to provide a uniform resistance spread along the sensor, hence corresponding accuracy in making measurements.

BRIEF DESCRIPTION OF THE INVENTION

The present invention utilizes a gauge apparatus for not only measuring liquid levels but also for providing an indication of the presence of foreign matter, such as water in gasoline. This apparatus includes a buoyant device adapted to float on the surface of the liquid being measured. An elongated electrical sensing device adapted to be arranged in upright position while immersed in the liquid is so constructed as to have an electrical characteristic which may be varied. Means are provided for connecting the buoyant device or float to the sensing device for movement with respect thereto in such a manner that the electrical characteristic may be varied in response to variations in elevation of the float caused by change in level of liquid. Means for measuring the electrical characteristic provide an indication of such level and other means for detecting foreign materials serves in providing an indication of the presence thereof and a respresentative visual and/or audible signal.

The means for connecting the float and sensing device together includes the use of the attractive force of a magnetic field, and in a practical operating embodiment, the sensing device is resistive and the variation in electrical characteristic is a variation in resistance. The magnetic field is provided by a permanent magnet device that provides a concentrated magnetic field along a straight path which extends longitudinally of the sensing device, and the float itself includes a body which is spherically shaped in an annular portion thereof which is formed of magnetic material. The float and magnets include mèans for maintaining the float in aligned registry with the aforesaid magnetic path while the annular portion thereof is in rolling engagement with the sensing device. The body of the float is a hollow shell and carries two parallel spaced apart annular magnets on opposite sides of and coaxial with the annular portion. These annular magnets are polarized radially to have opposite poles on the inner and outer circumferences, respectively, and opposite polarization with respect to each other, the axis of the annular portion and the two annular magnets lying in a plane substantially normal to the aforesaid path. The two annular magnets further straddle the path and are juxtaposed with respect to two strip magnets which form the magnetized path with the magnetic polarities of the facing surfaces of the respective strips and annular magnets being opposite. To further assure maintenance of aligned registry, as aforesaid, between the float and the magnetized path, a smaller diameter sphere of magnetic material is disposed inside the body or shell.

The sensing device includes a plurality of resistive elements connected in series by means of elongated, transverse, electrical contacts, respectively, which are operatively engaged by the float. The sensing device is enclosed within a film-like, sealed envelope of electrically non-conductive material which carries an elongated contact element extending longitudinally of the sensing device, this envelope being resilient and preformed to maintain this elongated contact element normally spaced from the aforesaid transverse contacts in the absence of a liquid pressure head. Such transverse contact elements also include material which is magnetic thereby serving as a magnetic shunt of flux lines from magnetic strips that produce the aforesaid magnetic path thereby providing stronger magnetic fields in the spaces between the transverse contact elements than directly thereabove. The force of attraction between the float and sensing device results in an imbalance of forces in those spaces such that the float positively comes to rest there rather than on top of such transverse elements. The elongated contact element being directly beneath the float is caused to engage directly with positive force the transverse contact elements on opposite sides of the space where the buoyant device may be momentarily yieldably locked thereby providing an electrical connection which results in a particular resistance between terminals of the sensing device which is measured by circuitry connected thereto. This circuitry and the sensor otherwise are so arranged that as the liquid level in the tank changes, the float will incrementally step from space-to-space between transverse contacts thereby providing firm contact pressures and different resistances which are interpreted by the electrical circuitry to provide a readout or alarm as to the position of the float in the tank, or in other words, the level of the liquid therein. Two forces are available for moving, and holding the elongated contact element (strip contact) into conductive engagement with the transverse contact elements, the pressure head of the liquid exerted along the submerged portion of the sensor and the magnetic field acting on the float. The pressure head of course progressively varies from zero at the surface to a maximum at the tank bottom such that contact pressure, hence resistance, due to the head at and near the surface can be negligible and erratic. This results in inexact and unstable contact closure at the surface thereby producing poor measurement resolution. Since the float is always at surface level and is forcefully, resiliently engaged with the sensor, firm, exact and forceful contact pressure results at the level thereby providing for a more stable and improved resolution.

The method of fabricating the sensing device which includes a variable resistance having a plurality of spaced contacts on an elongated array of resistors carried by an elongated, rigid support includes the steps of securing a flexible layer of conductive material to the surface of a sheet of flexible insulative material and securing such sheet to the support with the conductive material facing the contacts but spaced therefrom. The sheet is hermetically sealed to the support to envelop the contacts, the sheet being of an aromatic polyimide material. The method further includes folding opposite marginal portions of the sheet to provide straight, parallel and spaced apart corner portions. The marginal portions are secured to opposite sides of the support. The sheet is heated finally to an extent as causes it to preform in spaced relation from the resistors. The method further includes the step of adhering an elongated planar magnet to the support on the side facing the sheet. The magnet is polarized such that the surface facing the sheet has elongated contiguous opposite poles joined along a straight line, the array of resistors and contacts being mounted on the magnet surface.

It is an object of this invention to provide improvements in gauge apparatus in the form of manufacturing economics, less maintenance, and improved operating resolution.

It is another object to provide apparatus for sensing the presence and level of foreign matter, such as water in gasoline, and further provide for full level detection along with a suitable alarm function.

It is another object of this invention to utilize thin film techniques for fabricating the immersible sensor of the gauge apparatus of this invention.

It is a further object to provide a method for fabricating the buoyant device to have maximum buoyancy characteristics as compared with the weight and magnetic properties thereof.

It is still another object of this invention to provide a unique arrangement of a float and immersible sensor for providing an electrical signal representative of the level of liquid as well as a unique arrangement thereof whereby the two are functionally connected together by means of a magnetic field.

While there have been described above the principles of this invention in connection with specific apparatus, it is to be clearly understood that this description is made only by way of example and not as a limitation to the scope of the invention.

BRIEF DESCRIPTION OF THE DRAWINGS

In the drawings,

FIG. 1 is a longitudinal section of a typical cylindrical gasoline storage tank in which gauge apparatus of this invention is installed;

FIG. 2 is a cross section taken substantially along section line 2—2 of FIG. 1;

FIG. 2A is a fragmentary perspective of a portion of the immersible sensor and float as contained within the tubular support;

FIG. 4 is a side view partly cut away and sectioned for clarity of the buoyant device shown in FIG. 3;

FIG. 5 is a fragmentary sectional view of one portion of the buoyant device of FIGS. 3 and 4 partially cut away and sectioned for clarity of illustration;

FIG. 8 is a cross section taken along section line 8—8 of FIG. 6;

FIG. 9 is a cross section taken substantially along section line 9—9 of FIG. 6;

FIG. 10 is a sectional view like that of FIG. 7 but showing the buoyant device being magnetically attracted toward the transducer and the elongated contact element deflected into engagement with the transverse electrical contacts located in the position of tangential operative engagement by the buoyant device;

FIG. 10A is an equivalent electrical circuit diagram of the arrangement of FIG. 10;

FIGS. 19A and 19B are cross sections of the arrangement of FIG. 19 used for the purpose of explaining the balance of forces which retain the buoyant device in the position shown in FIG. 19A;

FIG. 20 is an equivalent bridge circuit incorporating a sensor of the preceding figures and is used for providing a simplified explanation of the operation of this invention;

FIG. 20A is a schematic diagram of the sensor portion of the bridge circuit of FIG. 20;

FIG. 21 is a simplified block diagram of the electronic circuitry used in the working embodiment of this invention;

FIG. 25 is a fragmentary longitudinal sectional view of the bottom end of the gauge tube showing the specific arrangement of the water filter and water-sensing probes.

PREFERRED EMBODIMENT OF THIS INVENTION

Figure 3:
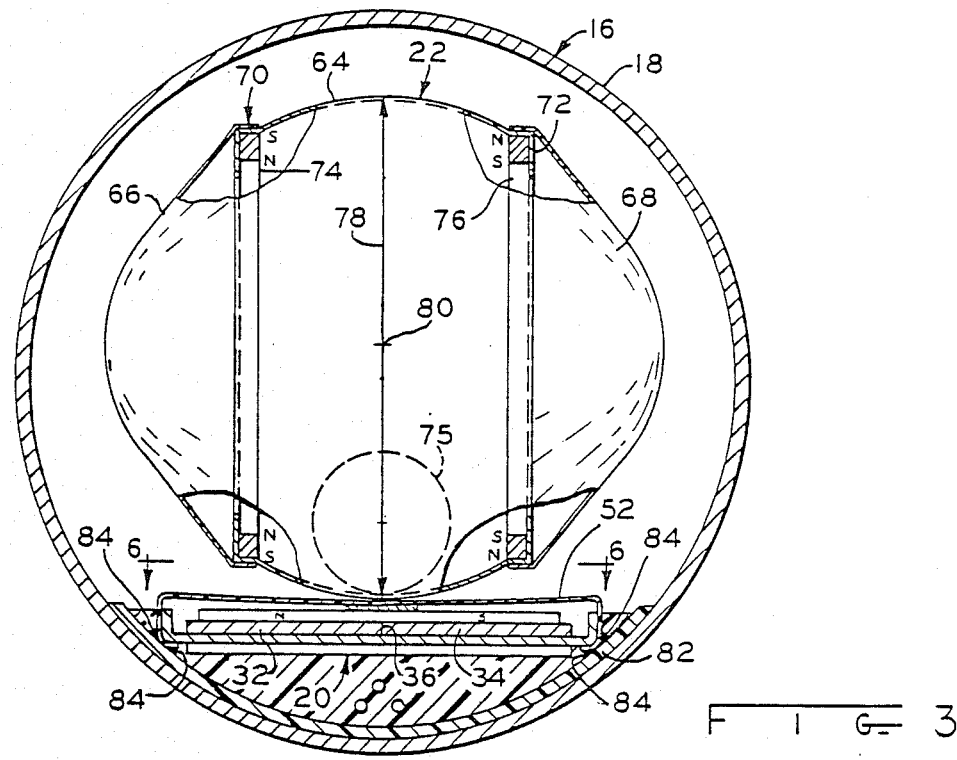
FIG. 3 is a cross section taken substantially along section line 3—3 of FIG. 1 showing a part of the gauge apparatus as mounted within an upright supporting tube.

Referring to the drawings, and more particularly to FIGS. 1 through 5 and 22, a conventional storage tank 10 for gasoline, adapted to be buried underground, has a filling spout 12 which normally is disposed as to have an open upper end near ground level. Within the tank 10 is situated the immersible portion 16 of the gauge apparatus of this invention. This portion includes an upright tubular housing 18, a resistor-magnetic sensing device generally indicated by the numeral 20, a buoyant device or float 22 operatively engaged with the sensing device 20 and a combination gas filter and water detection portion 24 at the bottom end (FIGS. 1, 22 and 25). The gauge portion 16 has a length substantially as shown, extending from a position inside the filler tube 12 to near the bottom of the tank 10. The sensing device (also denominated sensor) 20 is of about the same length extending from a position inside the filler tube 12 to near the bottom of the tank 10 but just above the gas filter and water-detecting portion 24. A typical length would be about six and one-half feet which corresponds to the diameter of a conventional storage tank 10. Any suitable means may be used for securing the gauge portion 16 rigidly in the tank 10 as shown.

Description of the Sensor

Referring more particularly to FIGS. 3 through 11, the sensor 20 will be described. It should be mentioned at the outset that many of the pieces and parts of the sensor are thin films made by sputtering, plating, and other well known thin film techniques corresponding to those used in fabricating printed circuits. In order to illustrate these thin films, it has been necessary to exaggerate the sizes and thicknesses thereof in the drawings, and as these are being specifically described, the dimensional characteristics and parameters will be explained more fully.

This sensor 20 is an elongated electrical device having an electrical characteristic which may be varied in response to changing level of liquid in the tank, and as disclosed is in the form of a two terminal variable resistor having spaced electrical contacts conductively connected to an elongated resistance with a variable contactor adapted to be engaged with selected ones of such contacts with forceful contact pressure so as to provide a corresponding value of resistance at the terminals. As will become apparent, contact closure is produced by two forces, one the magnetic attraction between a rubber magnet and a steel ball inside a float and to a much lesser degree the pressure head of the liquid.

The sensor disclosed includes an elongated, channel-shaped steel frame 26 having flanges 28 and 29 on opposite sides as shown. Superposed and adhered on the front surface 30 of the frame 26, this surface 30 being essentially flat, is a permanent magnet device consisting of two conventional flat, coplanar, rubber-like, magnetic strips 32 and 34 which extend for the full length of the frame 26 and which have opposite parallel straight edges. These two strips 32 and 34 are abutted together to provide a straight edge interface 36 and are further surface polarized such that the strip 32 on its front surface 38 is a north pole and the strip 34 on its surface 40 is a south pole. The rear surface of both of these strips would of course be of opposite polarity, respectively. The frame 26 thus becomes a magnetic shunt, the flange 28 a south pole and the flange 29 a north pole. The significance of these polarities will be explained more fully later.

While two strips 32, 34 are disclosed, preferably these are in the form of a single integral strip with two magnetic portions 32, 34. Thus, whenever and wherever two strips are disclosed, the single strip form is included, this applying to the specification, drawings and claims hereof. The single strip is magnetized to provide the same magnetic pattern as the two strips.

Fixedly superposed, by means of a suitable adhesive, is a layer of lamination 42 of an electrically insulative material, preferably this being an aeromatic polyimide, which is an extremely heat-stable organic polymer (see article entitled "Polyimides", MACHINE DESIGN MAGAZINE, Dec. 12, 1968 issue, Pages 71, 72 and 73).

This material is available in the form of thin films, one of these being manufactured by DuPont and known by the trademark KAPTON. Unless otherwise specified, the other plastic films and layers used herein will be of the same material. Sputtered and superposed to the front surface of the plastic layer 42 is a thin layer 44 of resistive material preferably nichrome 80-20.

Figure 6:
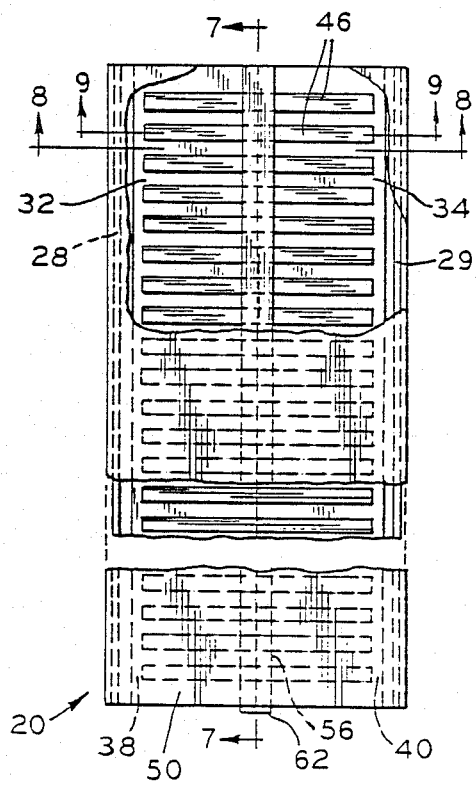
FIG. 6 is a front view of the electrical device or sensor showing primarily the transverse electrical contacts and the elongated contact element held in spaced relation therefrom.
Figure 7:
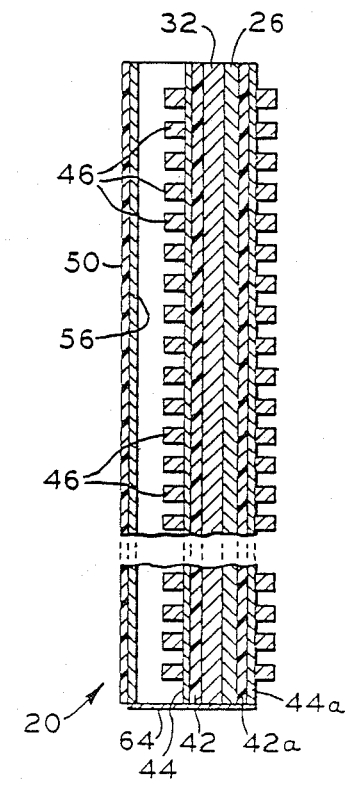
FIG. 7 is a longitudinal sectional view taken substantially along section line 7—7 of FIG. 6.
Figure 11:
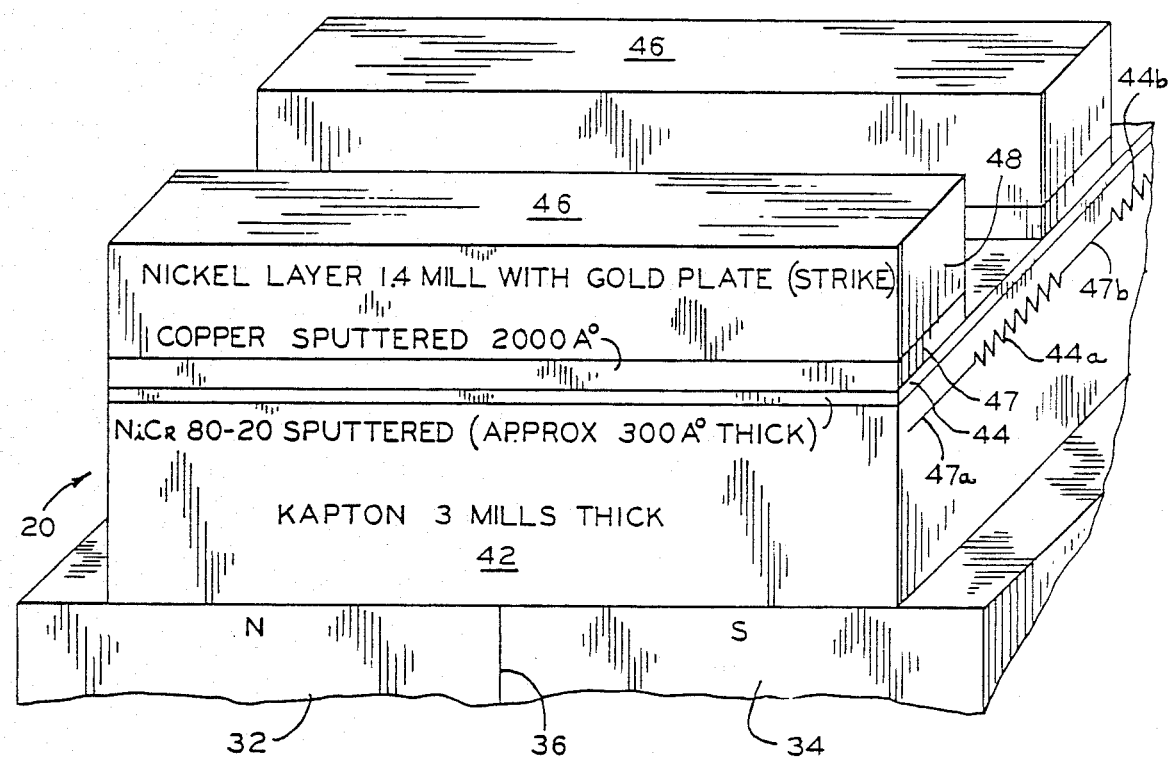
FIG. 11 is a partial perspective illustration, greatly exaggerated, of the physical construction of a representative portion of the sensor shown in the preceding FIGS. 6 through 10 and is used in explaining the construction and method of fabricating such portion.
Figure 12:
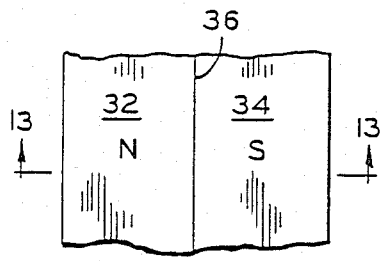
FIG. 12 is a diagrammatic view of the front side of the two permanent magnet strips which serve in providing the basic magnetic field that attracts the buoyant device into operative engagement with the sensor.
Figure 13:
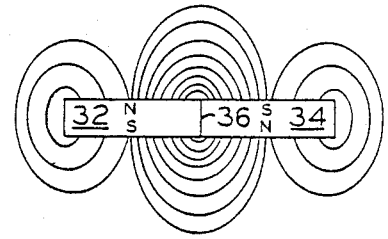
FIG. 13 is a cross section taken substantially along section line 13—13 of FIG. 12 illustrating a typical pattern of flux lines and force fields.

Secured to the front face of the nichrome layer 44 are a plurality of contact elements 46 which are in the form of elongated essentially rectangular bars which extend at right angles to the longitudinal axis of the frame 26 and are equally spaced apart and parallel as more clearly shown in FIG. 6. These transverse contact elements 46 are of metal which is both electrically and magnetically conductive. They are fabricated principally by the technique of sputtering first a copper layer of the same size on the nichrome layer 44 and then electroplating nickel on the copper film, this copper film being indicated by the numeral 47 and the nickel plating by the numeral 48. Magnified, the copper-nickel bar 47, 48 is rectangular. Typical thickness dimensions of these various laminations are illustrated in FIG. 11 where like numerals indicate like parts. The plastic film 42 has a pressure sensitive adhesive on the rear surface and may be one-half to three mils in thickness, the nichrome layer 44 about three hundred (300) Angstroms, the copper strips 47 two thousand (2,000) Angstroms, and the nickel strip 48 one and four tenths (1.40) mils. It can thus be seen that the laminated structure is composed of layers, laminations or films which are quite thin as compared to the other dimensions of the sensor, such as the frame 26 being about one and a quarter inch wide, the strip magnet 32, 34 being about one inch wide with each portion one-half inch wide, and the thickness of the latter being about one-eighth inch. It should be mentioned at this point that the strip magnet 32, 34 may be of any suitable material which produces a sufficiently strong magnetic field, but in the disclosed embodiment, it is of a conventional magnetic rubber material, such as that used in industry for seals on refrigerator doors. These dimensions are given at this point merely to emphasize the relative thinness of the laminations.

Further with respect to dimensions, the contact elements 46 are 0.050 inches wide and spaced apart about 0.050 inches. These contact elements 46 extend for the entire length of the gauge as illustrated in FIGS. 1 and 2.

Lastly, the exposed surfaces of the nickel contact elements 46 are gold plated with a thin coating more in the form of a gold "flash" having a thickness of no more than one micron. The reason for using the gold flash is to inhibit corrosion of the coated parts and to insure minimum contact resistance between the contact elements 46 and another switch element 56 to be described later.

Still referring to FIGS. 3, 6, 8 and 9, the sensor 20 additionally includes an enclosing envelope 50 of the same polyimide plastic as the layer 42, this envelope 50 being flat in the front part 52, having right angle corners 53 and extending down along side the flanges 28 and 29 of the frame 26 there to be hermetically sealed at 55 by some suitable wax or sealing compound which can withstand gasoline. Suffice it to say the envelope 50 is intended to seal the interior of the sensor against in-flow of gasoline or any liquid into which the gauge is immersed. The front 52 of the envelope is so formed as to be spaced from the front surfaces of the contact elements 46 by about 0.009 inch and otherwise is resilient such that upon deflecting it rearwardly toward and into engagement with the contacts 46, upon release, it will spring back to the spaced, illustrated position. On the rear surface 54 of the envelope is adhered by some suitable means such as sputtering, plating, or adhesive bonding, a flat, flexible strip of copper 56 centered over the interface 36 between the two magnet sections 32, 34 and normally spaced by almost 0.009 of an inch from the upper surfaces of the contact elements 46. This copper strip 56 is given a thin coat of electrolytic nickel which is not magnetic and this is then flashed with gold as previously explained, these layers or films being indicated by the numerals 57 and 58, respectively. The polyimide material of the envelope 50 is peferably in the form of DuPont's product, KAPTON, as previously explained. Three mils thickness for this envelope has been found to be satisfactory. The envelope 50 is sufficiently resilient and self-supporting that it will maintain the contact element 56, 57, 58 (hereafter 56) physically separated and out of engagement with the transverse contact elements 46.

As will now be apparent, reference also being made to FIG. 11, the sensor thus far described is basically a two terminal resistor composed of a multiplicity of resistors connected in series as diagrammatically illustrated in FIG. 11, the resistors being indicated by the numeral 44 with suffix letters "a" and "b" and the connections therebetween being indicated by the numeral "47" also with suffix letters "a" and "b". The connections 47a and 47b are actually made by the individual copper layers 47 which constitute an electrical short on the nichrome layer thereby leaving exposed, non-shorted nichrome in the spaces between the contact elements 46.

For purposes which will be explained later, a laminated contact assembly like that just described is also affixed by use of suitable adhesives and the like to rear face 60 of the frame 26 like numerals indicating like parts except for the addition of the suffix letter "a" to distinguish therebetween. The electrical characteristic of this assembly 42a, 44a, 46a, 47a and 48a differs only slightly from the resistance of the front laminated assembly 42, 44, 46 the front assembly having an overall resistance of 7.15K ohms and that of the rear assembly 42a, 44a, and 46a 6.65K ohms (the letter "K" indicates thousands).

In completing the electrically conductive portion of the sensor 20, a strip of copper indicated by the numeral 62 is soldered to the bottom edge of the assembled unit to be in conductive contact with the lower ends of the copper strip 56 and the two resistance layers 44 and 44a as shown more clearly in FIGS. 6, 7, 10 and 10a.

Method of Fabricating Envelope 50

Preferably, the polyimide film of envelope 50 is known by the trademark KAPTON and manufactured by E. I. DuPont de Nemours. The right angle corners 53 are formed by folding the film flat against itself like folding a piece of paper. This is performed at room temperature. Upon release, the film will spring back and assume near right angle corners at 53. This shape is retained by means of potting compound or glue indicated by the numeral 84 (FIG. 3) which secures the film edges to the channel 26 and fills the space between sensor 20 and an arcuate section 82 of plastic tubing (further described later).

After the compound has hardened, heat is applied to the surface 52 by any suitable means such as electrically heated air from a blower which causes the film to tend to return to its original, flat condition: it cannot because, of the epoxy potting compound holding the film edges to the channel 26. This causes the corners 53 to flex outwardly producing an outward bow in surface 52 that resiliently spaces it from contacts 46. The surface 52 can be flexed inwardly repeatedly against contacts 46 without cracking even down to cryogenic temperatures.

Buoyant Device

The buoyant device or flat 22 is more particularly illustrated in FIGS. 3, 4, 5 and 19 and will now be a described in detail. The device 22 is substantially spherical in shape and designed to flat on the surface of the liquid being measured. More particularly, it is a hollow shell uniquely constructed at least in part of magnetic material and so arranged as to be forcefully adhered to the sensor 20 by reason of the magnetic fields produced by the two strip magnets 32 and 34 and solid steel ball bearing 75. The float 22 is essentially a hollow shell composed of three pieces, a central annular portion 64 having a shape which conforms to an annular segment of a true sphere and two convexly shaped, nickel end caps 66 and 68 of identical construction which are sealingly fitted to the annular portion 64 as shown. The annular portion 64 is preferably formed of nickel to a wall thickness of about one mil and has annular sockets formed by retaining flanges 72 composed of cylindrical and radial portions as shown. The end caps 66 and 68 snugly fit over the cylindrical portion and may be sealed thereto by some suitable means thereby to hermetically seal the entire device 22. A smaller diameter sphere 75 of magnetic material, which may be simply a steel ball bearing, is contained within the shell 22 for free rolling movement therewithin, and two annular permanent magnets 74 and 76 are intimately fitted into the end sockets 70 and 72 and are there secured in place. These annular magnets 74, 76 are permanently magnetized with opposite poles on the inner and outer circumferences, and the two magnets with respect to each other are oppositely polarized as shown. As shown in FIG. 3, the south pole which is on the outer circumference of the annular magnet 74 is juxtaposed with respect to the north pole of the strip magnet 32. The north pole on the outer circumference of the annular magnet 76 is juxtaposed with respect to the south pole of the magnet 34. The two magnets 74 and 76 are arranged to be parallel and symmetrically disposed relative to the diameter 78 of the annular portion 64. The float 22 is adapted to have rolling engagement with the front surface 52 of the sensor 20 from one end to the other in aligned registry with the edge interface 36 of the two magnets 32 and 34. Stated otherwise, as the device 22 is rolled from one end to the other of the sensor, a plane which includes the interface 36 and the center of the annular portion 64 (this also includes the diameters 78, 88) will be defined with the float being symmetrical in properties and geometry on opposite sides of this plane. The sphericity of the annular portion 64 assures minimal contact area of the float 22 with the sensor which is an important feature of this invention as will be explained later.

Typical dimensions have been given for the elements of the sensor 20. With respect to the float, the radius of the annular portion 64 is 0.665 inches. The radius of curvature of the end caps 66 and 68 is 0.455 inches about a center measured 0.300 inches from the center 80 of the annular portion 64. The radius of the annular retaining ends 70 and 72 is 0.580 inches, the axial thickness of each of the annular magnets 74 and 76 is 0.060 inches. By calculation it can be determined that the area of contact between the circumference of the annular portion 64 and the front face 52 of the sensor 20 is about twenty square mills, this being significant for a reason which will be later explained. The sphere 75 is of solid cross section and has a diameter of 0.375 inches and a weight of 3.50 grams. The total weight of the float including the sphere 74 is preferably 7.90 grams, assuming that the liquid to be measured is gasoline. Further typical parameters as to the float 22 include a total buoyance of sixteen grams and a mid-point or equatorial buoyance of eight grams. The significance of this will be later explained also.

Also referring to FIG. 3, it should be noted that sensor 20 is fixedly secured within the supporting tube 18. This is accomplished by securing the sensor 20 to an arcuate section of plastic tubing 82 by means of potting compound 84 which fills the entire space therebetween the arcuate segment 82 also being adhered by some suitable means to the inside of the tube 18, such as by means of threaded fasteners. As will further be observed in FIG. 3, the tube 18 is only slightly larger than the combination of the sensor 20 and float 22, and in a working embodiment has an inner diameter of about 1.745 inches.

Functional Relationship Between Sensor 20 and the Float 22

Reference is now made to FIGS. 3, 10, 12 through 18 and 19 for an explanation of the functional relationship between the float 22 and the sensor 29. Simply stated, the float 22 is rollingly engaged with the front face 52 of the sensor 20 such that the float 22 can roll from one end to the other of the sensor 20 without deviating from the plane including the magnet interface 36 and the float diameters 78, 88 (FIG. 19) the diameter 78 and the center 80 always remaining in this same plane, which is normal to the plane defined by the front face of the strip magnet 32, 34. This alignment is automatically maintained by reason of balanced magnetic forces interacting between the float 22 and the sensor 20. The theory involved will now be explained.

Figure 16:
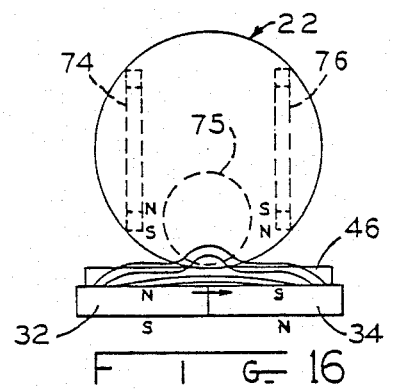
FIG. 16 is a cross-section similar to FIG. 15 but through one of the transverse contact elements and with the buoyant device thereontop, this view being used for the purpose of explaining the magnetic shorting function of the transverse contacts and the imbalance of forces exerted on the buoyant device.
Figure 17:
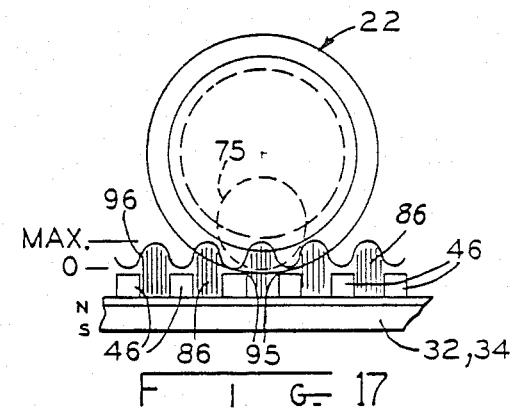
FIG. 17 is another diagrammatic illustration in longitudinal section showing the buoyant device on the sensor as otherwise shown in FIG. 14, this FIG. 17 illustrating the imbalance in the magentic fields in the spaces between above the transverse electrical contacts.
Figure 18:
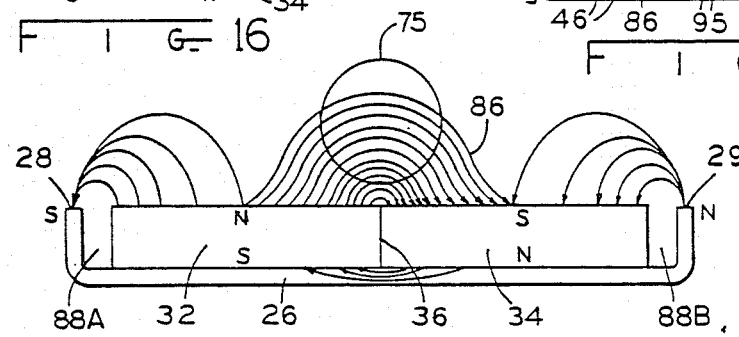
FIG. 18 is a cross-sectional illustration used for explaining the magnetic fields generated by the two strip magnets and the magnetic backing member.
Figure 19:
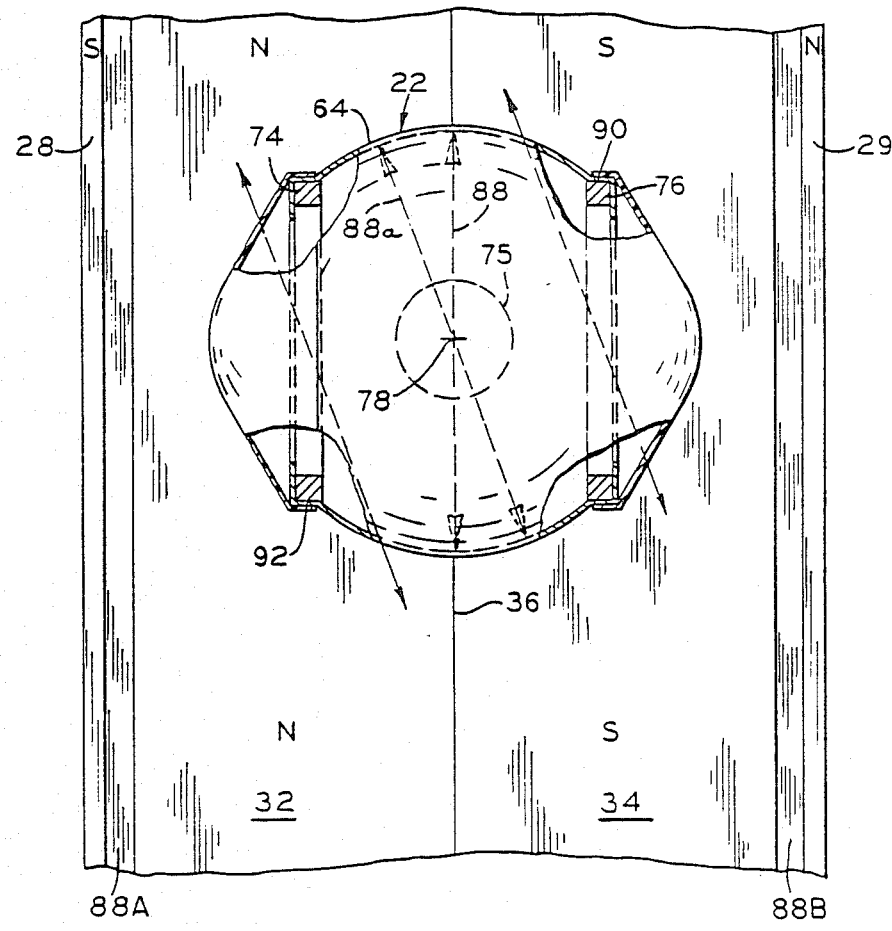
FIG. 19 is a fragmentary top plan view, also diagrammatic, of the buoyant device operatively superposed on the permanent magnet assembly and is used for explaining the forces of alignment exerted on the buoyant device to maintain it on the magnetized straight line path of the transducer.

Referring first to FIGS. 12 through 18, the two magnets 32 and 34 (or single strip magnet polarized the same) in free space will produce a field pattern of flux lines substantially as shown. With these two magnets abutted edge-to-edge to form the interface 36 placed on the front face of the frame 26 as shown in FIG. 18, this flux pattern will change as shown, a heavy field concentration occurring symmetrically over the interface 36 along the entire length thereof, the straight magnetic path so resulting being indicated by the numeral 86. The web portion of the frame 26 in engagement with the rear faces of the two magnets 32 and 34 acts as a magnetic shunt such that the flux lines pass directly between the rear faces. This enhances the strength or concentration of the flux along the path 86. Since there are two air gaps 88A and 88B formed between the opposite edges of the two magnets 32 and 34 and the flanges 28 and 29 of the frame 26, the upper edges of the two flanges 28 and 29 will have a magnetic polarity as shown which creates a flux pattern extending from the upper surfaces of the two magnets 32 and 34 thereto as shown. Thus, again referring to FIG. 18, and considering the polarity arrangement from left to right of the permanent magnet device thereshown, at the extreme left-hand side the upper end of the flange 28 will have a south pole, to the right of that the upper surface of the magnet 32 will have a north pole, to the right of the interface 36 the front surface of the magnet 34 will have a south pole and the upper edge of the flange 29 will be a north pole. This magnetic device therefore may be characterized as having magnetic poles extending longitudinally over the front face of the sensor in alternating arrangement transversely as shown in FIG. 19 looking from left to right or right to left. This is also illustrated in FIGS. 19A and 19B.

With the float 22 positioned against the front face 52 of the sensor 20 as shown in FIGS. 3 and 19, the concentrated field 86 (FIG. 18) will produce a strong magnetic force not only on the annular portion 64 but more so on the ball 75. The ball 75 tends to remain aligned with the straight path of this field 86 as the float 22 is rolled along the sensor 20 thereby holding the float 22 in registry with the straight path 86. The nickel of the float will help the magnetic flux to some degree, but due to its thin wall (0.001 inch) its reluctance will be much higher than the solid steel ball 75. By making all parts symmetrical and the various magnets alike, the float 22 will be retained in the upright position shown in FIG. 3 against turning or cocking movement. This is best explained by reference to FIGS. 19, 19A and 19B.

With respect to FIG. 19, it is assumed that the float 22 is pivoted about the yaw diameter 78 (perpendicular to the plane of magnets 32, 34) such that the orthogonally related diameter 88 is moved to position 88a. This results in moving the north pole 90 of the magnet 76 toward the north pole on the magnet 32 thereby creating a repulsive force. By the same token, the south pole portion 92 of the magnet 74 is moved toward the south pole of the flange 28, this also resulting in a repulsive force. These two repulsive forces co-act to cause the float 22 to rotate clockwise about the diameter 78 to the centered position at which the diameter 88a coincides with the diameter 88 which in turn lies in the plane of the interface 36 as previously described. It can be shown that by turning the float 22 clockwise in the same fashion the repulsive forces will force it back to centered position.

It will also be noted that the planes of the two, coaxial annular magnets 74 and 76 are normal to the plane defined by the front faces of the two magnets 32 and 34. Also these two magnets 74 and 76 are symmetrically positioned with respect to these two strip magnets 32, 34. Attractive forces between the magnets 32, 34 on the one hand and the annular magnets 74, 76 on the other maintain the magnets 74, 76 in the same respective planes; hence, the float 22 is subjected to stabilizing forces at all times such that in its rolling motion from one end of the sensor to the other it will always remain in the same rolling position as shown in FIG. 3 along the magnetic path 36. The annular portion 64 always remains adjacent to this path.

Another asymmetry of the float 22 is illustrated in FIGS. 19B, 19A illustrating the normal, symmetrical position and 19B one in which the float 22 is cocked or turned about the directional axis 88 which parallels interface 36.

Interacting fields due to magnets 32, 34 on the one hand and magnets 74, 76 on the other, produce a torque which urges and maintains float 22 in the centered position of FIG. 19A. These fields are in part denoted by flux lines 33 between magnets 32, 34 and lines 71 between magnets 74, 76. It will be noted that such fields are more symmetrical about the plane of the interface 36 and float center 78 with the float centered (FIG. 19A) than when tilted (FIG. 19B). A torque about axis 88 is exerted on the float 22 when off center (FIG. 19B) proportional to the field intensity and to the sine of the angle between the axis of the magnet (line joining poles) and the field direction. While the flux lines between the two magnet sets 32, 34 and 74, 76 may not be exactly parallel when float 22 is centered, they are approximately so and more symmetrically related than when float 22 is cocked as in FIG. 19B. This torque is in a direction counterclockwise (FIG. 19B). The opposite torque would apply should float 22 be cocked in the opposite direction. By providing that the float 22 moves or rolls freely along the length of the front surface of the two magnets 32, 34, the co-acting magnetic fields automatically turn or cock the float 22 to the upright position of FIG. 19A where the magnetic forces are balanced. Thus, between the magnetic forces acting as explained in connection with 19, 19A and 19B, the float 22 being essentially a sphere will roll on the sensor from one end to the other along the straight line 36 remaining in the upright position as shown in both FIGS. 19 and 19A. Thus, the magnetic flux is such that the yaw and roll are all constantly being corrected, to hold the float 22 symmetrically (not cocked) over magnet interface 36 as liquid level moves up or down.

Refer now to FIGS. 10 and 10A for an explanation of the significance of this balanced, stablized rolling engagement of the float 22 with the sensor 20. FIG. 10A diagrammatically illustrates the assembly as being immersed in gasoline. The level of the gasoline is indicated by the numeral 94 at which the magnetic forces hold float 22 against the front face 52 of the flexible line 50, forcing the latter along with the copper contact strip or contactor 56 against the underlying contact elements 46 as shown. This results in a connection being made between the variable contactor 56 and the contacts 46 which would amount to shorting of all of the resistance layer 44 between these contacts 46 and the connecting strip 62 which in a typical electrical circuit into which the sensor is connected is normally at ground potential. The total resistance then of the layer 44 between the terminal 126 and the two uppermost of the engaged contacts 46 as shown would be that length extending from the terminal 126 down to such contacts 46. Thus, with the float 22 at the very bottom of the sensor, only the bottom most contacts 46 would be engaged by the contactor 56 and the resistance appearing at the terminal 126 would be a maximum or that due to the entire length of the nichrome layer 44. By the same token, with the float at the top, with the top-most contact 46 being engaged by the copper strip 56, the resistance measured between the copper connector 62 and terminal lead 126 would be zero or a minimum.

Since the film of envelope 50 is flexible and is normally spaced only about 0.009 inches from the front of the contacts 46, the pressure head of the liquid into which the sensor is immersed will collapse the envelope 50 causing the contactor 56 to engage substantially all of the contacts 46 along the total length of the sensor that is submerged. The float 22 at its tangential point to contactor 56 forcefully engages the contactor 56 at the level of the liquid 94 thereby assuring minimal contact resistance and accurate positioning of engagement with the contactor 56 and the contacts 46 corresponding to the level 94 of the liquid. Without the float 22, the position of engagement of the contactor 56 with the contacts 46 can vary by as much as a quarter or a half an inch from the level of liquid, with the contact resistance resulting being erratic and excessive thereby failing to provide as accurate measure as is desired.

The pressure head at the surface of the liquid is zero and a short distance therebelow is only minimal; hence, the collapsing, contact closing force of this pressure head is correspondingly low with the result that the slightest disturbance can alter contact pressure and resulting resistance. The float 22 forcefully closes the surface level contacts 46 thereby reducing contact resistance to a minimum, this closure being essentially insensitive to like disturbances in the liquid inside tubular housing 18.

In the specific embodiment described, the attractive force of the float 22 against the sensor 20 is about fifty-five grams.

The degree of buoyancy or the buoyancy force of the float 22 is an important factor in obtaining a high degree of level-measurement resolution. Maximizing this buoyancy force for an incremental change in the level of liquid is assured by having the normal level 94 (FIG. 10) coincide with the equator of the float 22. Thus, if the level 94 should rise, for example, one-tenth of an inch, while the float 22 is being held stationary, this one-tenth of an inch can be equated to the change in volume between the new level and the old level 94 which will be a maximum at the equator.

In other words, if the new level of liquid is a tenth of an inch higher than the old level this would represent a volumetric change in the float 22 which is a maximum at the equator and a minimum at the poles. It can be shown mathmetically that the change in buoyant force due to this volumetric change and liquid level rise is a maximum when this change occurs at or near the equator of the float 22.

It is desired that for each incremental, measurable change in liquid level 94, the float 22 will move on the sensor 20 thereby engaging different contacts 46 to provide a different resistance representative of the new liquid level. In other words, it is desired that the float 22 be quite sensitive or responsive to liquid level change so as to change float position on the sensor 20 to provide a new resistance representative of the level change. The working embodiment given herein for float 22 provides for flotation at about the equator and thus contributes to a high, stable degree of measurement resolution.

The degree of magnetic pull versus buoyancy force in combination with the dimensional parameters of the sensor, and more especially the spacing between transverse contacts 46 further contribute to the high degree of resolution attainable. While the actual thickness of the contacts 46 (FIG. 11) is hardly perceptible to the human eye, a difference in height between the contacts 46 and the resistive layer 44 nevertheless exists and in the illustrated embodiment is about 1.4 mils. As explained earlier, the area of contact between the float 22 and the surface 52 is about twenty (20) square mills. Thus, it can be easily perceived that the float 22 operatively bearing against two adjacent contacts 46 and more particularly the adjacent corners thereof is more stably positioned than if it were merely engaged with the flat top of one contact 46. Therefore, there is a tendency for the float 22 to come to rest at a position which is in registry with a space between two contacts 46. With respect to moving the float 22 from that position upward or downward (parallel to sensor 20), there will be some resistance to this movement, since the float 22 must roll up a slight incline to pass over the respective contact 46. Therefore, a definite level change must occur before the float 22 will move to a new position. Slight wave action, therefore, tends not to disturb the position of the float 22.

Figures 14, 14A:
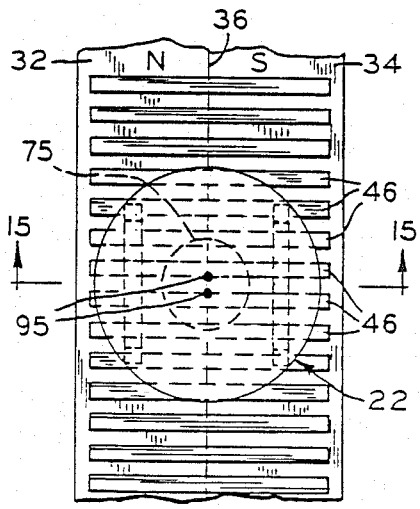
FIG. 14 is a view similar to FIG. 12 but of the sensor itself having the transverse electrical contacts thereon and the buoyant device in operative position thereupon.
FIG. 14A is an electrical circuit diagram illustrating the areas of engagement caused between switch contacts by the normal engagement of the buoyant device with the sensor.

This stable positioning of the float 22 is further explained in connection with FIGS. 14 through 18. FIG. 14 shows the float 22 in operative engagement with two adjacent contacts 46, the dots 95 representing the areas of contact between the copper strip 56 and the contacts 46. As explained earlier in connection with FIG. 18, a flux field is produced above the strips 32 and 34. This flux is partially shunted by the low reluctance paths afforded by the contacts 46 which are formed of nickel. This shunting is illustrated in FIG. 16 which shows the flux lines passing through the contact 46 and through the float 22. However, in the space between the contacts 46, there is no shunt and the flux field tends to fill the air space thereabove, thereby providing a pattern of field strength, longitudinally of the sensor, along the order of a sine wave 96 illustrated in FIG. 17. It is not to be understood that this pattern is necessarily in the form of a sine wave, but this pattern is used for the purpose of explaining that the field is a maximum in the spaces between the contacts 46 and a minimum thereover.

Figure 15:
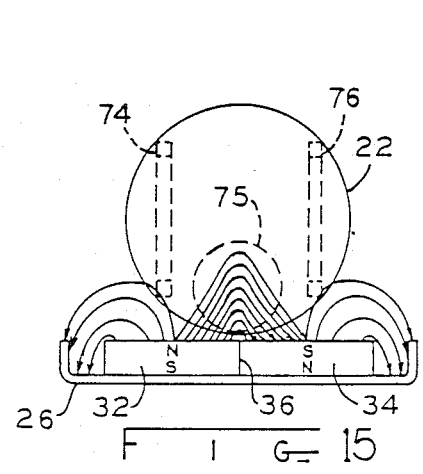
FIG. 15 is a cross section taken substantially along section line 15—15 of FIG. 14 showing a typical magnetic field through the buoyant device in the spaces between the transverse contact elements.

It will now be apparent as shown in FIGS. 15 and 17, that when the float 22 is situated between the contacts 46 a maximum of flux is available in that location further to retain the float 22 at rest in this position instead of on top of one of the contacts 46 as explained earlier.

Now for an incremental change in liquid level, there will be some further resistance to the movement of float 22 to a next position between two adjacent contacts 46, since not only does float 22 have to roll up an incline to overcome the slight rise in the engaged contact 46, it also must overcome the magnetic force holding it in position between contacts 46. Once the float 22 breaks loose, it will then move to the next position corresponding to the change in liquid level and there will lock into position between two contacts 46. Essentially, the float 22 can be said to step or snap incrementally between contact pairs rather than move smoothly continuously therebetween, the stepping action assuring a more stable readout by means of equipment shown in FIGS. 20 and 21 to be described later.

Water Detection Portion of the Gauge

Referring to FIG. 25, the bottom end portion of the gauge tube 18 is shown to which is attached a device 24 for detecting the presence of water in the bottom of the tank, assuming the tank otherwise to be filled with gasoline.

Extending downwardly from the lower end of the tube 18, is a tubular housing 100 of electrically insulative material which is secured thereto by suitable fasteners such as screws 102. A predetermined distance above the closed bottom 104 are a plurality of holes 106 spaced vertically, or in other words axially along the housing 100. A disc shaped insulator 108 is superposed on the upper end of the housing 100 and is provided with a central aperture which registers with a central bore 110 in the housing 100. This bore 100 is further defined by a tubular protrusion 112 adapted to receive thereover in removably fixed relationship a tubular hydrophobic filter 114. The lower end of the filter 114 fits over a suitable, cylindrical embossment 116 as shown on the bottom end cap 118 of the housing 100. These parts are threaded together so as to facilitate changing the filter 114.

A suitable electrical conductor 120, in the form of an elongated copper wire or the like is secured to the disc 108 to pass through a suitable opening 122 in the upper end of the housing 100 in electrically insulative relationship and at its lower end is bent at right angles to extend through the wall of the housing 100 as indicated by the numeral 124 to thereby be exposed. An additional conductor-probe 120, 124 (not shown) is mounted in like manner in laterally spaced parallelism to the illustrated conductor-probe 120, 124. Assuming that the gauge is positioned in a tank such that the bottom end 104 is immediately adjacent to the bottom of the tank the distance between the bottom and the position of the exposed probes 124 will determine the depth of water which can exist in the tank without being detected. Once the level of the water rises to the point as to cover the probes 124, then its presence can be detected by means of accessory electronic devices connected thereto.

Assuming that the gauge is submerged in a tank of gasoline, this liquid passes through the openings 106, the filter 114 and upwardly through bore 110 and into the interior of the tubular member 18. Thus, disturbances of the liquid which could cause surging, wave action and the like within the tank, such as during rapid filling or dispensing, are essentially isolated from the liquid within the tubular member 18. Thus, the float 22 is subjected to minimal disturbances only and in view of the various, favorable forces acting on the float 22, it will tend to remain in position unless and until an actual change in liquid level within the tank occurs.

Electrical Circuitry

Reference is made to FIGS. 10, 10A, 20, 20A, 21 and 22. As explained previously and as will appear obvious from the circuits as shown in FIGS. 10A, 20, 20A and 21, the sensor-float 20, 22 combination is in reality, a linear, resistive, liquid-level sensing device which corresponds to a variable resistor in that it changes resistance in response to changes in liquid level. The unshorted length of the resistance layer 44, enclosed within the resiliently flexible envelope 50, continuously represents, in ohms, the distance from the top of the sensor down to the liquid surface. This is graphically illustrated by the two-terminal linear resistance schematic in FIG. 10a which is the equivalent electrical circuit of the sensor of FIG. 10. The resistance change along the length of the sensor is linear offering uniformity of measurement over the entire measurement range. Resulting resolution is fixed by the precisely-spaced contact elements 46, 46a, the resistances 44 and 44a therebetween being essentially equal or in other words 10 ohms. As both FIGS. 10 and 10A illustrate, all of the contacts 46 below the surface 94 are shorted by reason of the pressure head of the liquid medium and the float 22. This sensor 20 also shown in FIG. 20a is connected into one leg of a four leg bridge circuit (FIG. 20) which in general corresponds to a Wheatstone bridge. This bridge circuit is the equivalent of the actual circuit as shown in FIG. 22 (actually FIGS. 22A through 22E).

The resistive part 44, 46 of the sensor 20 has two terminals 126 and 128, the latter being grounded, while the sensor portion 44a, 46a has terminals 128 and 130. To the terminal 130 is connected one end of a zero-offset adjusting potentiometer 132 having a slider 134 connected to a read-out device 136. The other terminal 126 also connects to the read-out device 136. The remaining two legs 138 and 140 have resistances and current sources as shown and are connected together at the bridge terminal 142. A regulated source of voltage is connected across the bridge terminals 128 and 142 in shunt with a zener diode 145 for supplying operating power. Only that portion of the circuitry consisting of the sensor 20 (FIG. 10a and FIG. 20a) needs to be immersed in the tank, the remaining circuitry being situated normally at a remote location. As the liquid level changes, the resistance of the leg 44, 46 changes, and as is conventional in any bridge circuit, this change in resistance can be measured by the read-out device 136.

Referring more specifically to FIG. 21, a slightly more elaborate block diagram including the bridge circuit of FIG. 20 is shown of the entire electronic circuitry which not only includes the bridge circuit of FIG. 20 but also two additional circuits for sensing the presence of water in the tank 10 and also the point in the tank 10 which is regarded as being filled to full capacity. This same circuitry of FIG. 21 is shown in working detail in FIGS. 22 through 24 which will be explained later.

A series of single pole, double throw switches as shown within the dashed line box 145 are ganged together by a common push button linkage 146. With the switches in their illustrated positions, the level read-out device 136, the water sensing circuit 148 and the high level detection circuit 150 are all operatively connected to the tank 10.

With reference to FIGS. 20 through 22, it should be noted that the two legs 138 and 140 of the bridge circuit contain constant current circuits 152 and 154, respectively. These circuits 152, 154 maintain the current in the bridge legs constant even though there may be an impedance change therein. For example, the constant current source 152 maintains the current designated IA constant through the two bridge legs 138 and 44, 46, and the circuit 154 maintains a current IB constant in the bridge legs 140, 132 and 44a, 46a. In a working embodiment of the invention, the two currents IA and IB are one hundred microamperes. More specifically, these constant current circuits function such that, should the resistance of the sensor 20 change, the current flowing through the total resistance 44, 46 thereof will remain at the value IA (one hundred microamperes). This being true, the potential drop across each incremental resistance 44 is the same irrespective of the elevation of the float 22 on sensor 20. The circuitry is so arranged that with each step of the float 22 from one pair of contacts 46 to the adjacent pair, the distance traveled by the float 22 is one tenth of an inch and this provides a one tenth volt change in potential. In other words, for each step or increment of movement between adjacent contacts 46, a one tenth volt change is produced which is measured by the read-out device 136. For each tenth of an inch change in level of the liquid within the tank 10, the read-out device 136 is designed to provide an indication of this change directly in tenths thereby indicating directly the level of the liquid within the tank. This is accomplished without any amplification whatsoever in the system.

The potentiometer 132 is used to calibrate the read-out device 136 and this is accomplished by inserting a conventional measuring stick previously calibrated into the tank and determining the actual liquid level. The slider 134 on the potentiometer 132 is then adjusted until the read-out device 136 provides a like reading. Thereafter, any changes in liquid level as measured by the resistance 44, 46 will be indicated directly on the readout device 136.

The circuit shown in FIG. 22 is of an actual working embodiment of this invention set up to monitor a total of six different tanks simultaneously. Some values of the components and type numbers of the circuitry are indicated directly on the diagram and those that are not listed hereafter. Circuitry is connected to the water-detecting probes 124 (FIG. 25). Another part of the circuit indicated as high level detection 150 serves the purpose of providing an indication or alarm during the filling of a tank that the tank is either nearly filled or is at full position.

FIG. 22 (FIG. 22D) shows apparatus for monitoring six different fuel tanks on an individual basis, a series of six ganged switches 144, 144a, 144b, 144c, 144d and 144e being individually operable for the purpose of selecting a particular tank. This series of switches are all contained within a single package wherein the ganging connections 146 of all of the switches operate such that when the push button 147 for the switch assembly 144 is depressed to "on", all of the other push buttons 147a, 147b, 147c, 147d and 147e will be released to "off" positions. Thus only one of the six tanks is monitored at any single time.

It is preferred that the constant current circuits 152 and 154, the readout circuit 136, the water sensing circuit 148, the high level detecting circuit 150 all be contained within a temperature controlled cabinet or housing wherein the temperature is controlled to within plus or minus two degrees at a center temperature of about one hundred and ten degrees Fahrenheit. The temperature controlling circuit is indicated generally by the numeral 156 which contains heating element 158 series connected with a field effect transistor 160 between ground and an unregulated power supply 162.

The regulated power supply 164 (FIG. 22A) supplies the regulated voltages indicated for the remainder of the circuitry. This includes the two constant current circuits 152 and 154 which will now be described. Circuit 152 includes a voltage divider 166 between the positive terminal and ground. An adjustable tap 168 connected to one of the two input terminals of operational amplifier 170. A line 172 leads from the positive terminal 142 through a resistor 174 to the other input terminal of operational amplifier 170 and also to the source terminal 176 of a field effect transistor 178 of the type known as a P-channel Enhancement Mode Vertical D-MOS Power Field Effect transistor. The output terminal 180 of the operational amplifier 170 is connected to the gate 182 of the transistor 178. The drain terminal 184 of transistor 178 is connected to line 138 through a resistor 186. Line 138 leads to one of the input terminals of the readout device 136 as shown. When the tank switch 144 for the tank number one is actuated, all the switches therein are closed as shown in FIG. 21 thereby making a direct connection from line 138 to the sensor resistor 44, 46. It will be noted that the two contacts 188 and 190 connected together in the output circuit of the constant current source 152 are the same as the corresponding contacts 188 and 190 (see FIGS. 21 and 22E) for the ganged switch 144, the movable arm of that switch being denoted by the numeral 192, this arm actually being in the form of a slider connected to the gang link 146. Movement of the push button 147 carries with it all of the sliders 192a, 192b, and 192c, along with the slider or arm 192, this switch arrangement being conventional and known as model F15062VEEBF1101BAG and F15066UGRBF1401-BAG, manufactured by ITT Shadow Division of International Telephone and Telegraph, Inc.

If it is desired to select tank number two (2) for monitoring, the push button 147a is depressed thereby turning that switch "on" and the switch 144 "off" making the same connections in the circuitry for tank two (2) as just explained in connection with tank number one (1) (see FIG. 21).

The other constant current circuit 154 is identical to that of circuit 152 with the exception that the value of the output resistor 194 is different as indicated. The voltage dividers 166 and 166a are made adjustable for the purpose of adjusting the currents in the output circuits thereof to be equal, for example, one hundred microamperes. The functioning of the constant current circuits will now be described. Since both of the circuits operate identically, an explanation of one will suffice for both.

With reference to circuit 152, the variable resistance 168 is adjusted to provide one hundred microamperes in the output circuit as previously explained. The same one hundred microamperes is conducted by the transistor 178. If a resistance connected into this output circuit 138 changes, such as the resistance 44, 46 of the sensor 20, it is desired that this one hundred microamperes remain constant. This is accomplished by reason of the feedback circuit between the transistor 178 and the operational amplifier 170. If the resistance 44, 46 should decrease, this would normally result in an increase of current flow; however, because of the feedback circuit between the transistor 178 and the operational amplifier 170, the impedance of the transistor 178 increases by an amount sufficient just to offset the reduced resistance in the sensor 20 thereby maintaining a constant current of one hundred microamperes. Thus, for each incremental resistance 44, the potential drop thereacross will remain the same. This potential drop is the same whether the float 22 is at the bottom of the tank or at the top.

Figure 22A:
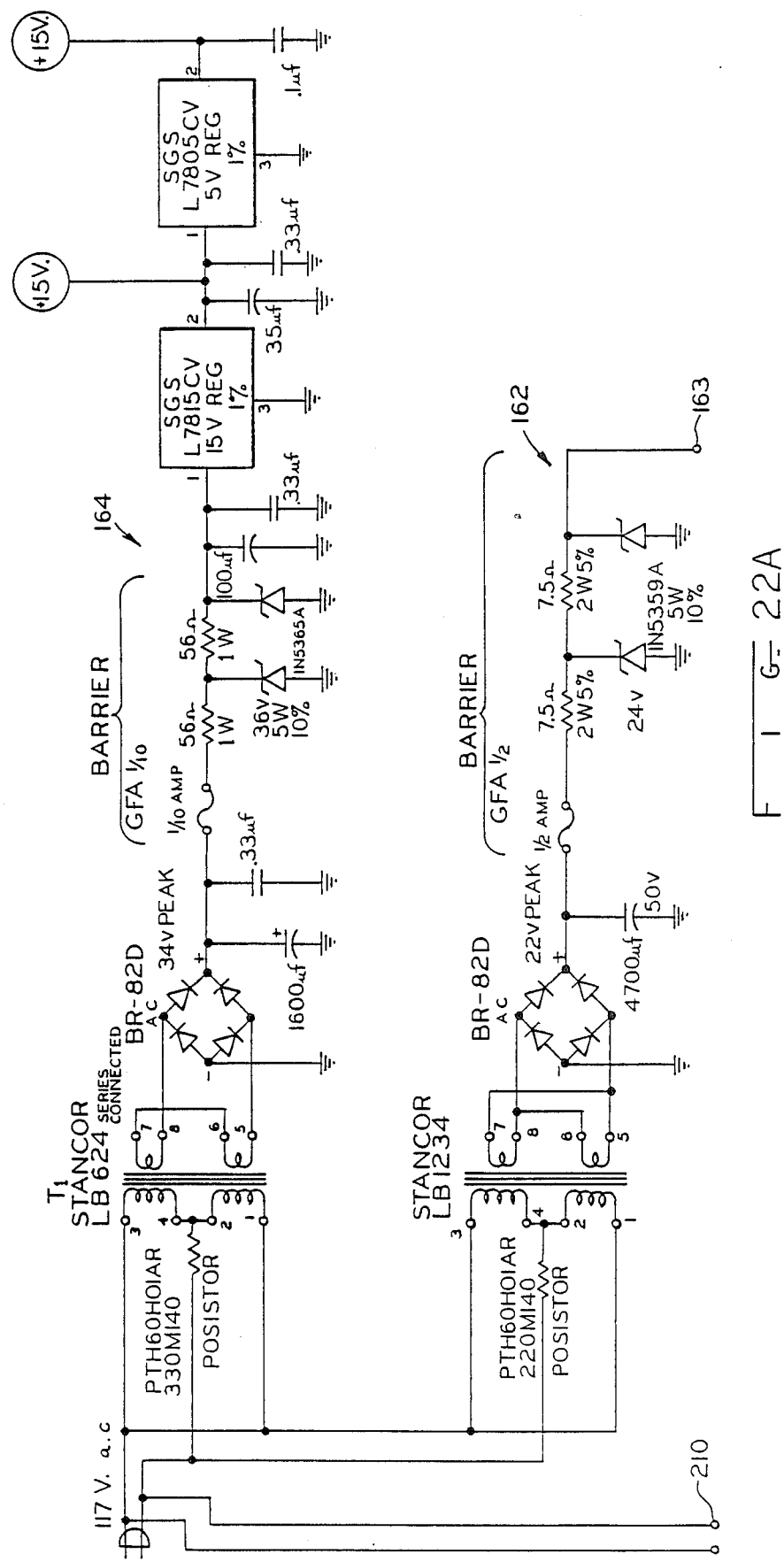
FIGS. 22A through 22D are schematic diagrams of a working embodiment of that portion of the circuitry of FIG. 21 relating to the actual measurement of liquid level and is a further detailed schematic of the bridge circuit of FIG. 20.
Figure 22B:
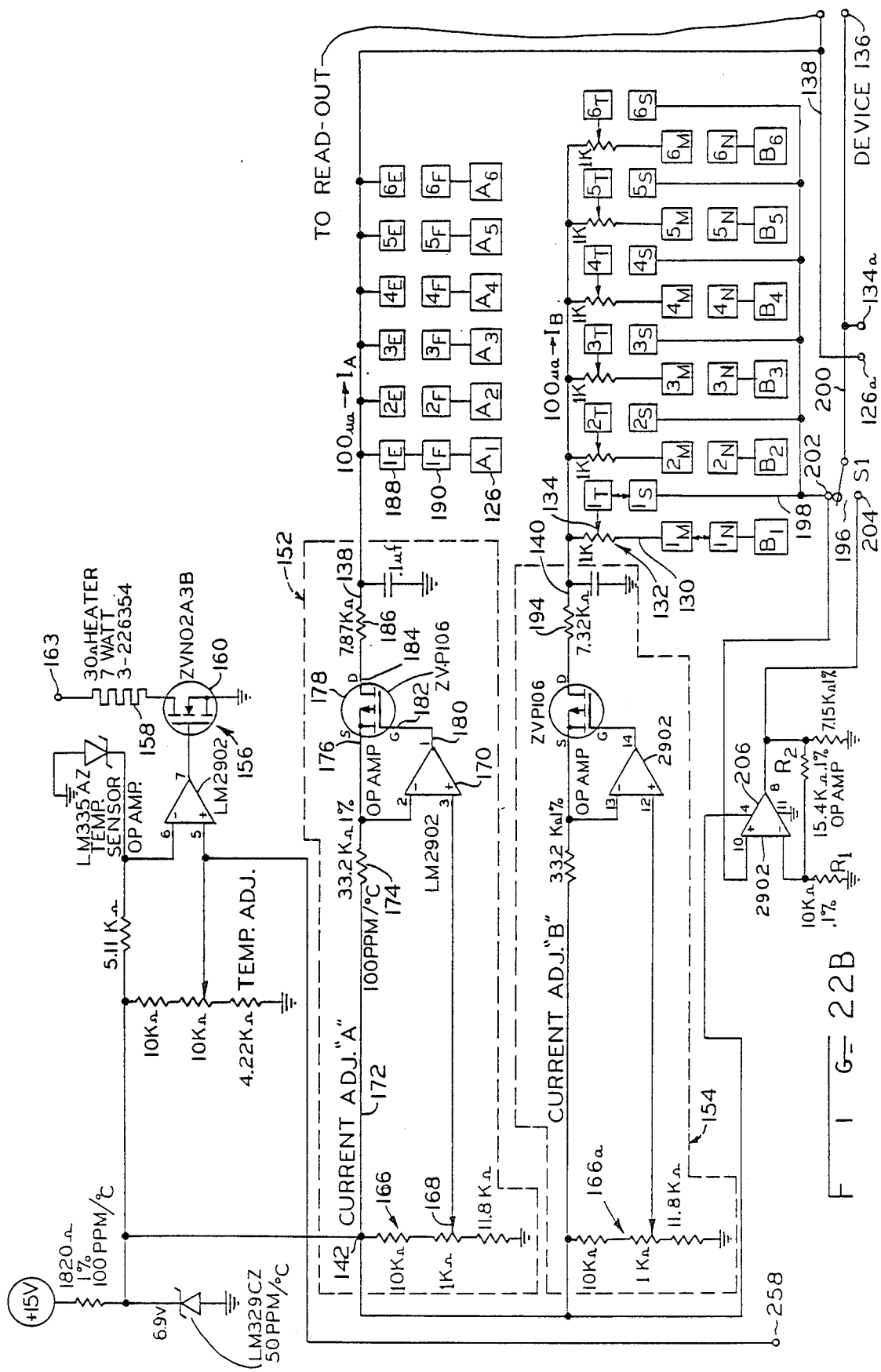
Figure 22C:
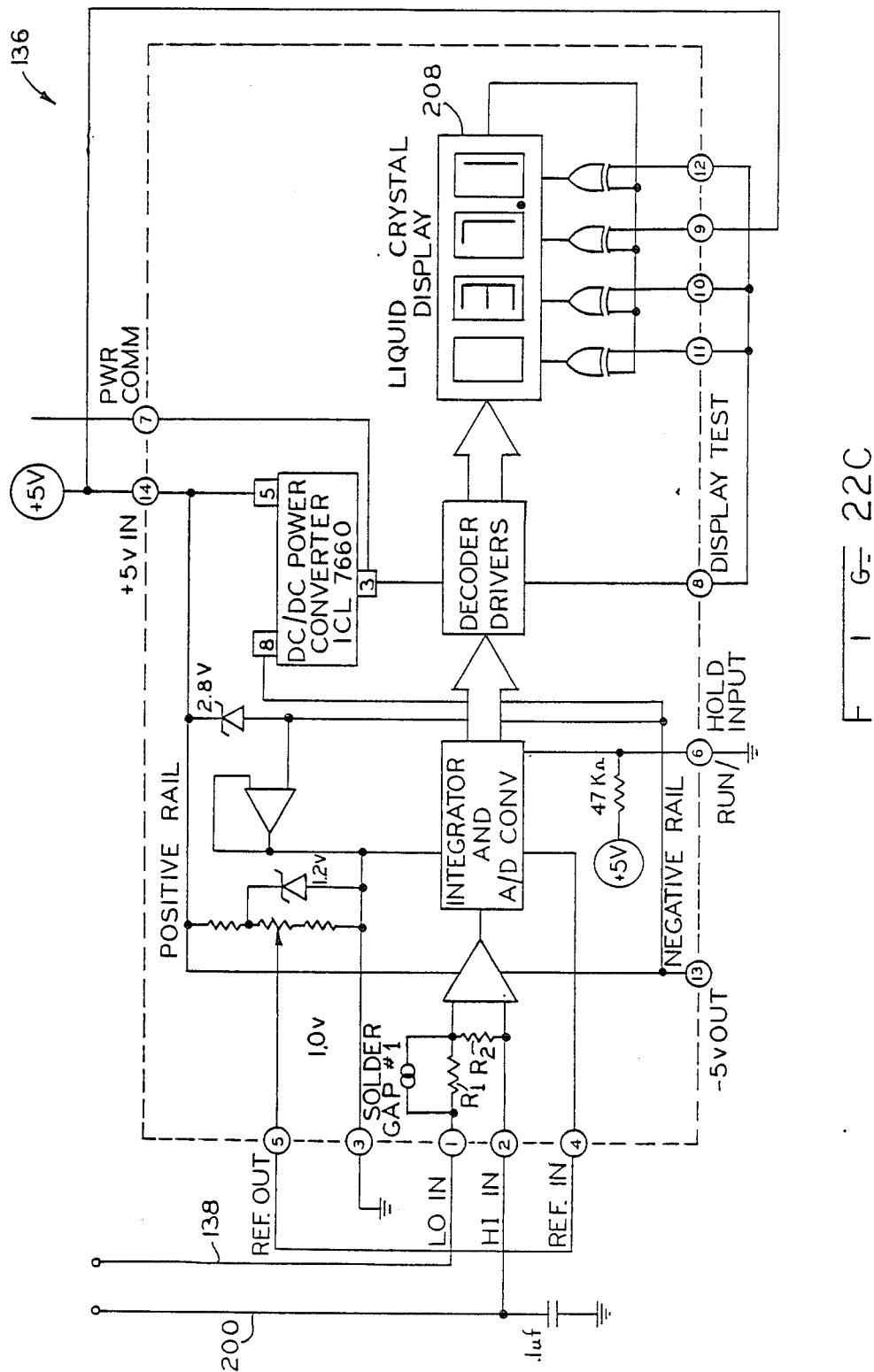
Figure 22D:
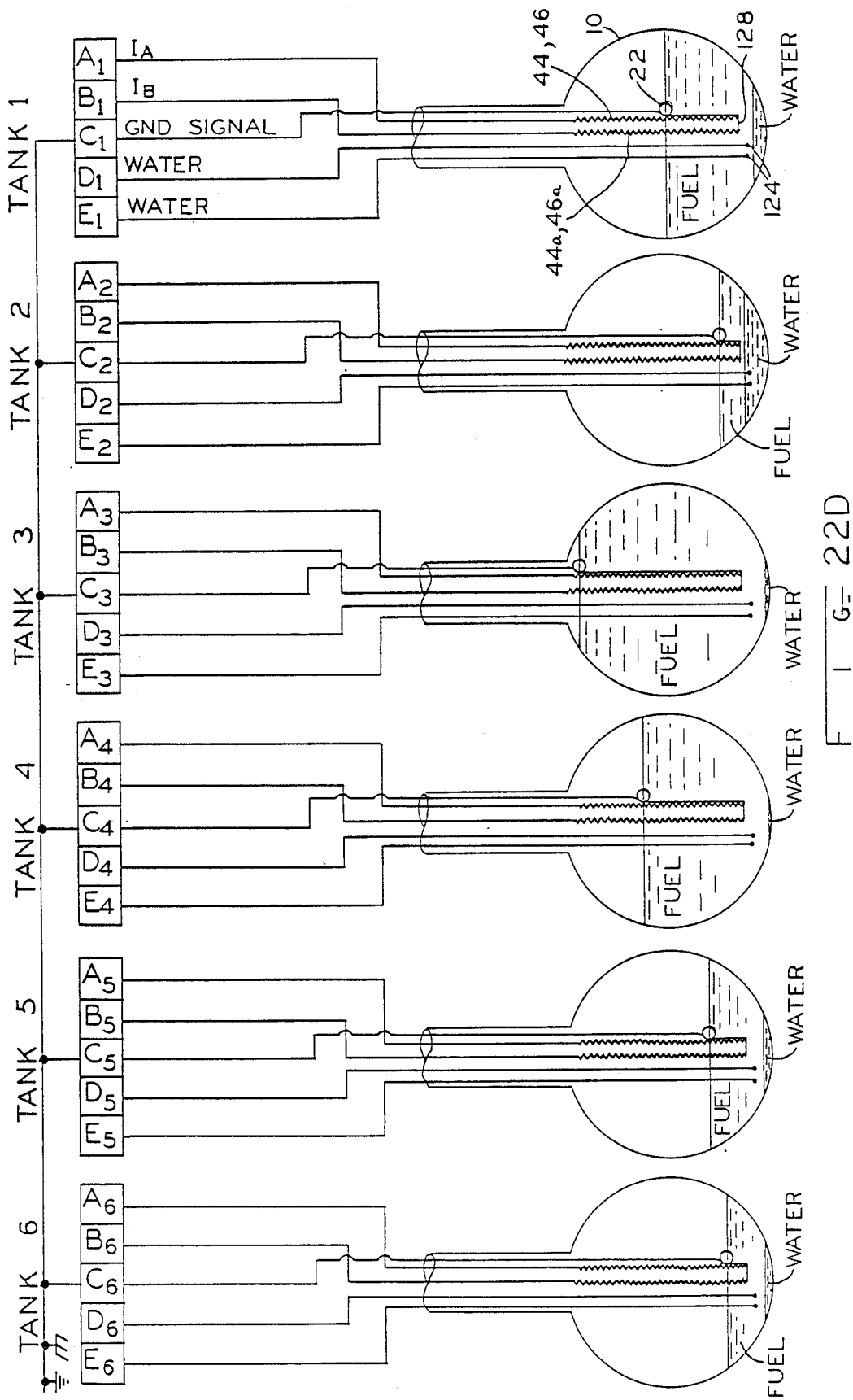

A single pole, double throw switch 196 FIG. 22B) is connected to the tap 134 on the potentiometer 132 by means of a line 198. A connection is made through the switch to a line 200 which leads to the second of the two inputs of the readout device 136. This switch 196 is for the purpose of switching from between units of measurement in the British and Metric systems, a contact 202 providing a readout in inches and the contact 204 in centimeters. The circuit 206 provides for this conversion. The readout device 136 is conventional and commercially available, being identified as a DM-LX3 Single Board Differential LCB #3 as manufactured by G. E. DATEL of Mansfield, Md. 02048, U.S.A. The readout is in the form of a liquid crystal display 208.

Water Sensing Circuit

Figure 23:
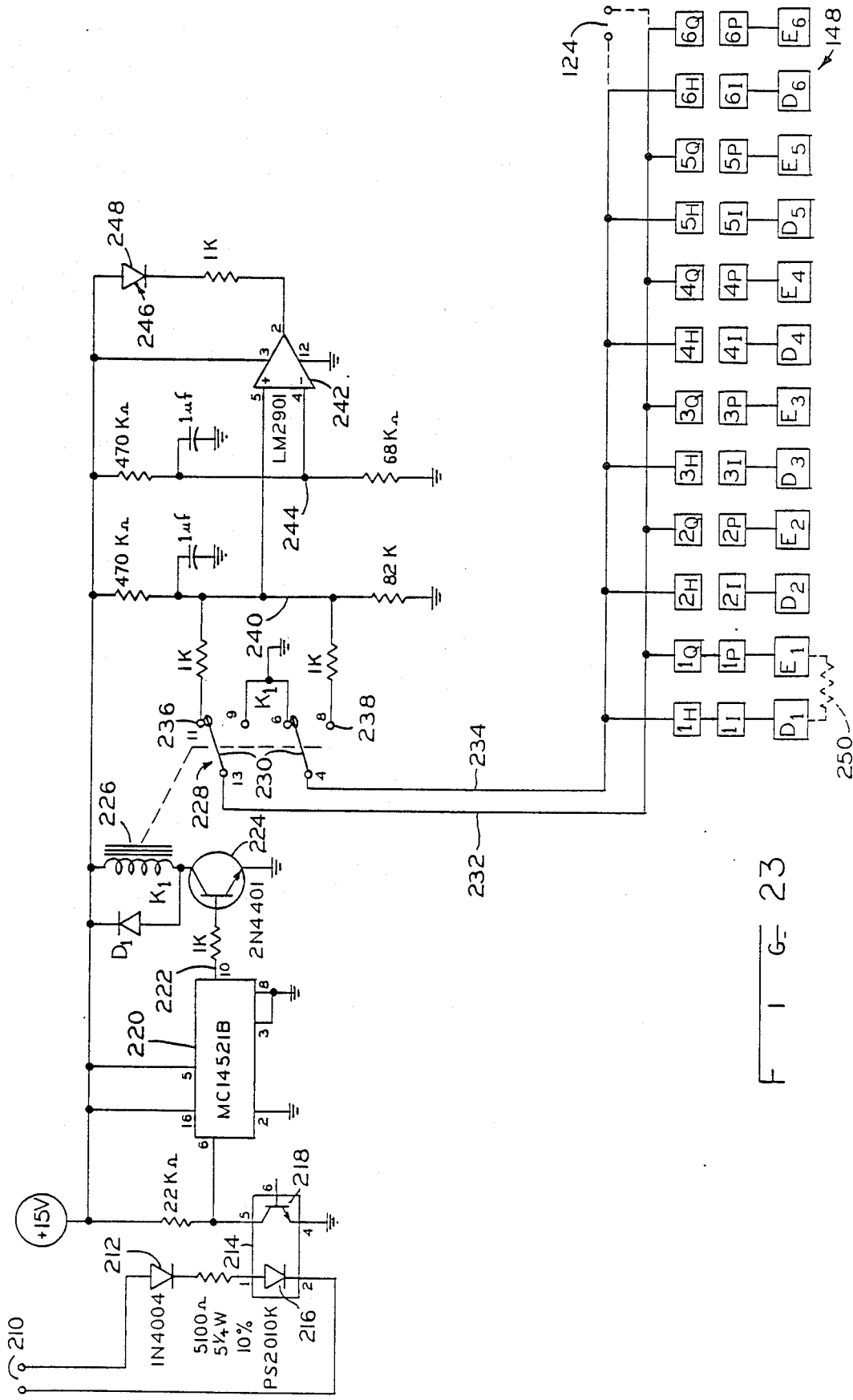
FIG. 23 is a schematic diagram of a working embodiment of the water sensing circuit of FIG. 21.

The water sensing circuit 148 is shown in detail in Fig. 23. Alternating current power at a voltage of for example, one hundred and seventeen volts A.C., is applied to power terminals 210 which in turn are series connected with a diode rectifier 212 and a photo coupling device 214 composed of a photo diode 216 and a photo sensitive transistor 218. The diode rectifier 212 is polarized to conduct only the positive wave portions which serve to excite the infrared diode 216. Radiation from the diode 216 is directed onto the photo sensitive transistor 218 which is connected between a source of "B" supply voltage and ground as shown. The purpose of the photo coupler 214 is to electrically isolate the circuitry to the right-hand side of the photo sensitive transistor 218 from the power line potentials to the left thereof.

To the photo transistor 218 is connected a frequency divide 220 having an output circuit 222 at which output pulses having a period of 36.4 minutes appear. These long duration pulses are applied to the transistor 224 to which is connected the coil 226 of a double pole, double throw relay indicated generally by the numeral 228. As these long duration pulses are applied to transistor 224, the relay 226, 228 is cycled moving the armatures between their statorcontacts. To these armatures are connected lines 232 and 234 which in effect lead to the two water-sensing probes 124 (FIGS. 22 and 25). The stator contacts 236 and 238 of the two different switch sections are both connected to a voltage divider as shown which provides 2.7 volts on the line 240. This line 240 is connected to the high input terminal 5 of the operational amplifier 242. Another voltage divider provides normally a 1.36 volts D.C. on line 244 which leads to the low terminal number 4 of the operational amplifier 242. The output terminal of the operational amplifier 242 connects to a light-emitting diode 246 as shown.

The light-emitting diode 246 normally has about fifteen volts on the anode 248 thereof such that the voltage on the cathode, or in other words at the output terminal of the operational amplifier 242, must be sufficiently negative with respect to that on anode 248 in order for the light emitting diode 246 to be excited. This is accomplished by switching the input terminals of the operational amplifier 242 such that the output terminal 2 goes to ground thereby applying a total of fifteen volts over the light emitting diode 246 which causes it to luminesce.

Control of the operational amplifier 242 is effected by the circuits including the lines 240 and 244 which are responsive to change in conductivity across the two lines 232 and 234 caused by the tank probes 124 becoming immersed in water. When these probes 124 are not immersed in water, the resistance therebetween may be considered as infinite. However, when they are immersed, the conductivity therebetween increases and this is represented by a dashed line resistor 250 in FIG. 23. This resistance is applied between the two armatures 230 which results in reducing the voltage on the line 240 from the idling voltage of 2.7 volts D.C. causing the output terminal of the operational amplifier 242 to connect to ground. As explained previously, this causes the light-emitting diode 246 to luminesce. In the absence of the resistance 250, in other words, the two water probes 124 are not immersed in water, the voltage on line 240 is normally 2.7 volts D.C. and that on line 244 is 1.36 volts D.C. This results in a reversal of voltages applied to the input terminals of operational amplifier 242 and the output terminal to rise to "B+" voltage, in other words, to the same voltage as is normally applied to the anode 248 of the light-emitting diode 246. In this instance, the light-emitting diode 246, of course, will not luminesce. Thus, whenever the light-emitting diode 246 does luminesce, it constitutes a warning that the water level within the particular tank being monitored has risen to a preset level.

The reason for using the frequency divider 220 which produces the long duration pulses having a period of 36.4 minutes is that it is desired to prevent the probes 124 from being eaten away by electrolysis. Each time the long duration pulse cycles, the relay 226, 228 also cycles moving the armatures 230 to the other of the two stator contacts which results in applying opposite polarity potentials to the two probes 124. In other words, in one position of the relay 226, 228 one probe is positive, the other negative, and for the other position, this polarity is reversed. The deleterious affects of electrolysis is therefore inhibited or avoided.

High Level Detection Circuit

Figure 24:
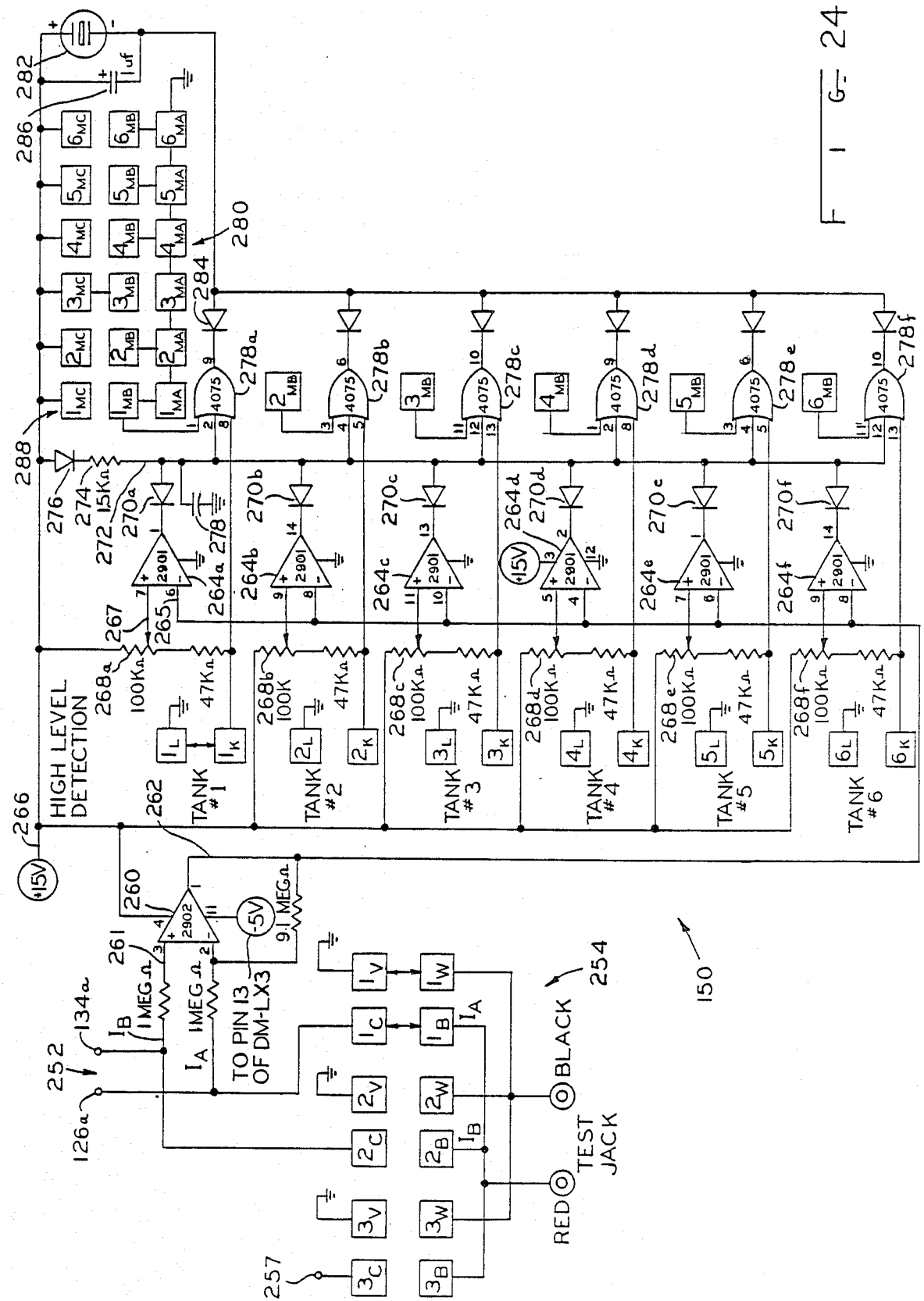
FIG. 24 is a schematic diagram of a working embodiment of the high level-detecting circuit of FIG. 21.

Referring to FIG. 24, the high level detection circuit 150 has a two wire input circuit, generally indicated by the numeral 252, which in reality is connected in parallel with the two wire input circuit to the readout device 136. In other words, this two wire circuit 252 is connected into the bridge circuit schematically shown in FIG. 20 across the two terminals 126 and 134 otherwise indicated in FIG. 24 as 126a and 134a. A test-switching circuit indicated generally by the numeral 254 has switch elements connected as shown with leads to the same input terminals 126a and 134a and an additional terminal 156 connected to terminal 257 leading from the heater circuit 258 (FIG. 22B) as shown. The nomenclature and the switch elements of the switching device 254 correspond to the same switch elements shown in the other figures.

Also connected to the input terminals 126a and 134a is an operational amplifier 260, the output terminal thereof being connected by means of line 262 to one of the two input terminals of six voltage comparators 264a, 264b, 264c, 264d, 264e and 264f, there being one such voltage comparator amplifier for each of the six tanks.

A "VDD" supply line 266 has six different potentiometers 268a, 268b, 268c, 268d, 268e and 268f connected at one end thereto, the other end leading to a respective switch element as shown. The slider on each of the potentiometers leads to the other terminal of the respective operational amplifiers 264 as shown.

The output terminal of each voltage comparator amplifier 264 has a diode 270a, 270b, 270c, 270d, 270e and 270f in series with the line 272 as shown. In series with this line 272 is a resistor 274 and a flashing light-emitting diode 276. A filter capacitor 278 is connected between the line 272 and ground.

Figure 22E:
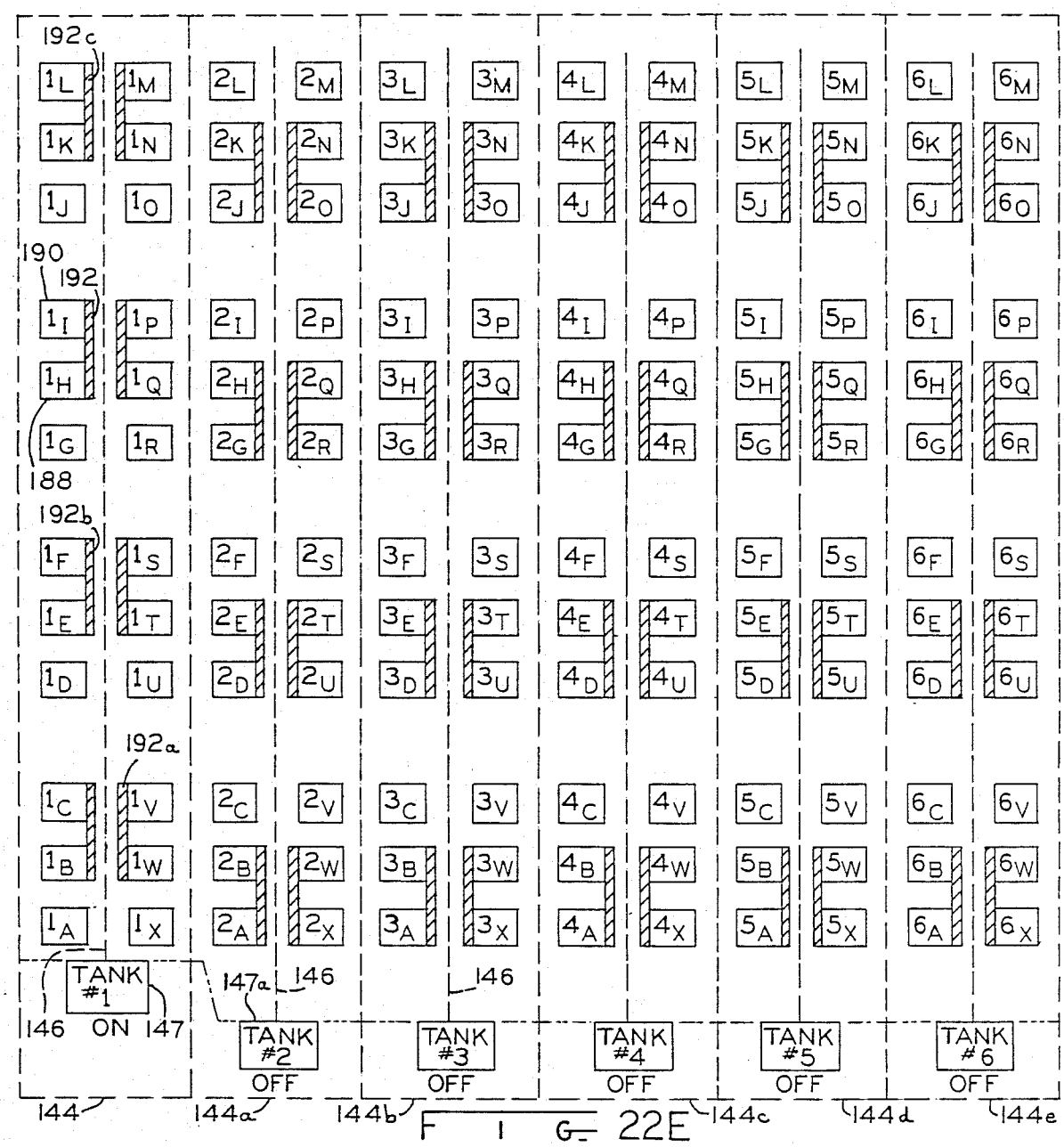
FIG. 22E is a diagrammatic illustration of the ganged double pole, double throw switches used to select the particular one of the six tanks shown in FIG. 22D for monitoring.

There are six three-input terminal OR gates 278a, 278b, 278c, 278d, 278e and 278f connected to the line 272, the bottom end of the potentiometer 268 circuit and contacts 1MB and 1MA of a switch assembly indicated generally by the numeral 280. This switch assembly 280 is shown in further detail in FIG. 24A, but suffice it to say it is composed of six independent sections, each section being a double pole, double throw switch of the slider type in which the elements "B" and "E" of each of the switch sections constitute the switch armature. Thus, referring to FIG. 24, the particular switch armature under discussion is denoted by the symbol 1MB, and the two adjacent stator contacts denoted as 1MA and 1MC. The drawing shows the switch for tank 1 being thrown to the position at which the armature 1MB is connected to the stator contact 1MA. It will further be noted that this contact 1MA is grounded. This places one of the terminals of the OR gate 278a at ground as well as a second terminal via the connected switch contacts 1K and 1L (FIG. 22E).

A piezo-electric audible alarm 282 is series connected between the positive buss 266 and the output terminal of the OR gate 278a, a diode 284 also being in series as shown. A filter capacitor 286 is connected in shunt with the alarm 282.

Since the individual circuits for the six tanks are alike, a description of one will suffice for all, this being the one for tank number one (1). The purpose of this circuitry is to provide a signal indicating that the tank being filled has reached a predetermined level. This predetermined level may be full or something short of that. In the following it will be assumed that a full-tank condition is to be detected and indicated to an operator so that the filling process can be terminated promptly. The circuitry initially needs to be calibrated for a "TANK FULL" condition. This is accomplished by filling the tank and stopping the filling operation when the tank has reached the desired level. The potentiometer 268a is then adjusted just to the point at which the flashing light emitting diode 276 is energized and the alarm 282 sounds.

The potentiometer 268a is now adjusted and needs no further attention unless a different fluid level is to be detected.

As explained earlier, the input circuit 252 is connected between the bridge terminals 126, 126a and 134, 134a. Assuming that the tank is empty and is in the process of being filled, as the level rises and the float 22 rises on the sensor 20, the voltage at the terminal 126 (FIGS. 20, 21 and 22) as compared with that at the terminal 134 progressively drops. When the tank is completely filled, this potential at the terminal 126 will be a minimum. Since it is the voltage difference at the two terminals 126, 134 which is being monitored, for convenience, the change in voltage occurring at the terminal 134 may be examined, this relatively speaking progressively increasing in stepped increments as previously explained. The operational amplifier 260 is connected as an ordinary amplifier having a gain of ten, for example, which produces a positive-going output voltage which increases in accordance with the voltage applied to the terminal 261 from the bridge terminal 134, 134a. This same voltage appearing on line 262 is applied to terminal 265 of the voltage comparator amplifier 264a. When this voltage rises above the threshold voltage applied to the terminal 267, the operational amplifier 264a switches from a state of high voltage to low voltage in the output circuit. This in effect connects the output terminal of this amplifier 264a to ground with respect to the positive supply buss 266 such that a current now flows through the light-emitting diode 276, the resistor 274, line 272, diode 270a to ground via voltage comparator amplifier 264a. The luminescing pulsing light-emitting diode 276 thus indicates that the tank has reached a predetermined level of fill.

Simultaneously, the output of the OR gate 278a is switched to logic "0" by reason of the low voltage on the line 272 connected to the center input terminal thereof. Since all three terminals are now at ground potential, the output signal of the OR gate will also be at ground potential. This ground potential causes the piezo-electric 282 to sound.

Figure 24A:
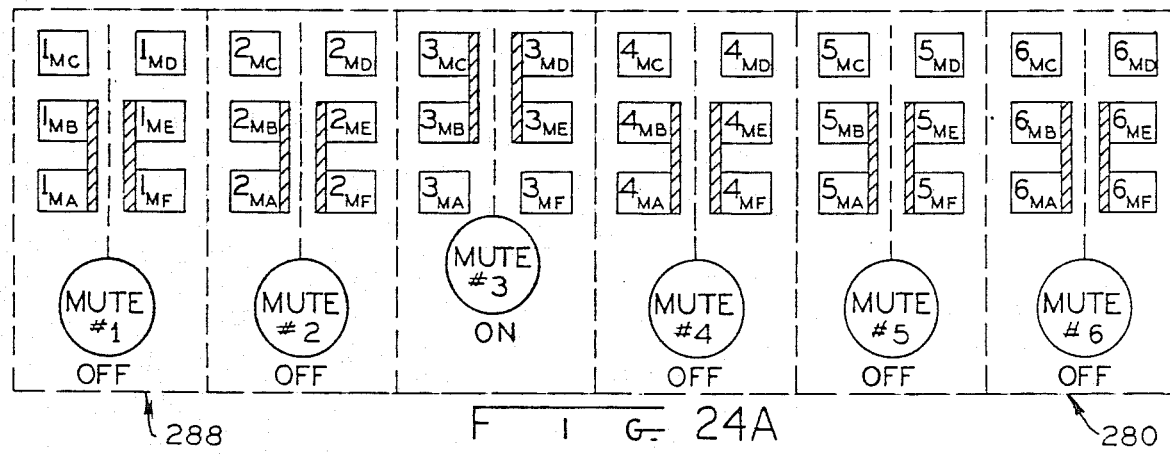
FIG. 24A illustrates a muting switch assembly used in conjunction with the high level detection circuit of FIG. 24.

Unless some means is provided to turn "off" the alarm 282, it will continue to sound until enough liquid is drawn out of the tank to drop the voltage on line 262 to a value at which the voltage comparator amplifier 264 is reversely triggered providing a high output voltage on line 272 which would trigger the OR gate 278a "off", or in other words, to a high voltage condition at the output terminal thereof. In this situation, a positive voltage is applied to both sides of the alarm 282 to de-energizing it. However, the alarm 282 may be disabled by merely operating the muting switch for tank "1", otherwise indicated by the numeral 288. This results in closing the contacts 1MB and 1MC and opening the contacts 1MB and 1MA (FIGS. 24 and 24A). This breaks the circuit to ground and causes the OR gate 278a to change state from "ground" to "positive". This places positive voltage on both sides of the alarm piezoelectric 282 thereby de-energizing it. The light-emitting diode 276 will continue to flash; however, this is not considered to be objectionable. For convenience, in the circuit of FIG. 24 and the switch configuration of FIG. 24A, the muting switch for tank number 3 is shown as having been actuated to disable the alarm 282. It should be noted that the muting switches one through 6 are independently operable to both "on" and "off" conditions and are not ganged. Thus, the alarm 282 may be muted for any one or all of the tanks as may be desired.

At this point in the operation, the operator needs to know when he can turn the muting switch or switches to the "off" position in readiness for another fill. The logic is to provide a signal for the purpose, and this signal is the de-energization or turning "off" of the light emitting diode 276. The circuitry is so arranged that this de-energization will occur after the level of the voltage applied to the terminal 261 of operational amplifier 260 drops by an amount to cause a reduction in voltage on line 262 connected to terminal 265 of operational amplifier 264a sufficiently to cause this voltage comparator amplifier to trigger to logic high at the output terminal. This voltage will be slightly lower than the voltage required to trigger the operational amplifier 264a oppositely. Thus a hysteresis is built into the circuit to cause the light-emitting diode 276 to extinguish sometime after the level of the liquid has been lowered from the maximum. When the light emitting diode 276 is extinguished, this serves as an indication that the particular muting switch 288, etc. can be turned "off" thereby to enable the circuit to the alarm 282 for the next tank-filling operation.

While specific components and circuits are specified in the drawings and hereafter of a working embodiment, it is to be understood that these are not to be considered as limitative of the invention but also as exemplary. Changes may be made without departing from the spirit and scope of this invention.

| TYPE | DESCRIPTION | MANUFACTURER |
| --- | --- | --- |
| ZVP0106 | 60 Volt D-MOS | Ferranti |
| LM329C | 6.9 Volt Ref. Diode | National |
| LM335A | Temperature Sensor | National |
| LM2901 | Quad. Comparator | National |
| LM2902 | Quada. Op. Amp. | National |
| MC14521B | Frequency Divider | Motorola |
| MC14075B | 3-Input "OR" Gate | Motorola |
| ZVN02A3B | D-Mos "OR" Gate | Ferranti |
| RFP15N05 | | RCA |
| CNY17C | Photo Coupler | NEC |
| 2N4401 | Transistor | Any |
| 1N914/1N4148 | Diode | Any |
| 1N4004 | Diode | Any |
| CQX-21 | Blinking LED RED | Telefunken |
| | Blinking LED GREEN | Any |
| DS2E-S | 12 VDC Relay | Arromat |
| Heater Strip | 7 Watt | MINCO ETC. |
| DM-LX3 | 3½ Digit Meter | Datel Intersil |

In the drawing the following listed symbols have the noted meaning. Those not listed have meanings which are conventional in the art.

| | |
|---|---|
| K | Thousand |
| Mf | Microfarad |
| AMP | Ampere |
| Ω | Ohm |
| W | Watt |
| Reg | Regulated |
| V | Volt |
| MEG | Million |
| PPM | Parts Per Million |

While there have been described above the principles of this invention in connection with specific apparatus, it is to be clearly understood that this description is made only by way of example and not as a limitation to the scope of the invention.

What is claimed is:

1. The method of fabricating a variable resistance sensor having resistors carried by an elongated rigid support, comprising the steps of securing a flexible layer of conductive material to the surface of a sheet of flexible insulative aromatic polyimide material, securing said sheet to said support with said conductive material facing said resistors but spaced therefrom, folding opposite marginal portions of said sheet to provide straight parallel and spaced apart corner portions, securing said marginal portions to opposite sides of said support, and heating said sheet to an extent as causes it to locate in spaced relation from said resistors.

2. The method of claim 1 including the step of securing said sensor inside an elongated supporting tube having an opening in the lower portion thereof for the inflow of liquid.

3. The method of fabricating a variable resistance sensor having resistors carried by an elongated rigid support, comprising the steps of securing a flexible layer of conductive material to the surface of a sheet of flexible insulating material, securing said sheet to said support with said conductive material facing said resistors but spaced therefrom, adhering an elongated planar magnet to said support on the side facing said sheet, polarizing said magnet such that the surface facing said sheet has elongated contiguous opposite poles joined along a straight line, and mounting an array of resistors and contacts on said magnet surface.

4. The method of fabricating a variable resistance sensor having resistors carried by an elongated rigid support, comprising the steps of securing a flexible layer of conductive material to the surface of a sheet of flexible, insulative aromatic polyimide material, securing said sheet to said support with said conductive material facing said resistors but spaced therefrom, folding opposite marginal portions of said sheet to provide straight parallel and spaced apart corner portions, securing said marginal portions to opposite sides of said support, and heating said sheet to an extent as causes it to locate in spaced relation from said resistors.

* * * * *